US011250886B2

(12) United States Patent
Anwar et al.

(10) Patent No.: US 11,250,886 B2
(45) Date of Patent: Feb. 15, 2022

(54) POINT OF VIEW VIDEO PROCESSING AND CURATION PLATFORM

(71) Applicant: FieldCast, LLC, Spokane, WA (US)

(72) Inventors: Saeed Z. Anwar, Spokane, WA (US); Tenzing P. Tshering, New York, NY (US)

(73) Assignee: FieldCast, LLC, Spokane, WA (US)

( * ) Notice: Subject to any disclaimer, the term of this patent is extended or adjusted under 35 U.S.C. 154(b) by 0 days.

(21) Appl. No.: 16/847,241

(22) Filed: Apr. 13, 2020

(65) Prior Publication Data

US 2020/0349977 A1   Nov. 5, 2020

Related U.S. Application Data

(63) Continuation of application No. 14/870,101, filed on Sep. 30, 2015, now Pat. No. 10,622,020, which is a
(Continued)

(51) Int. Cl.
*G11B 27/036* (2006.01)
*H04N 19/44* (2014.01)
(Continued)

(52) U.S. Cl.
CPC ........ *G11B 27/036* (2013.01); *G06K 9/00718* (2013.01); *G06K 9/00744* (2013.01);
(Continued)

(58) Field of Classification Search
CPC ..... G11B 27/036; G11B 27/10; G11B 27/005; H04N 7/181; H04N 5/247;
(Continued)

(56) References Cited

U.S. PATENT DOCUMENTS

| 4,102,564 A | 7/1978 | Michael |
| 6,819,354 B1 | 11/2004 | Foster et al. |

(Continued)

FOREIGN PATENT DOCUMENTS

| CA | 2549772 A1 | 10/2007 |
| EP | 2884751 A1 | 6/2015 |

OTHER PUBLICATIONS

Copending U.S. Appl. No. 16/939,003, filed Jul. 26, 2020 entitled "Point of View Multimedia Provision".
(Continued)

*Primary Examiner* — James M Pontius
(74) *Attorney, Agent, or Firm* — Bekiares Eliezer LLP

(57) ABSTRACT

Embodiments of the present disclosure may provide methods and systems enabled to perform the following stages: receiving a plurality of content streams; retrieving metadata associated with each of the plurality of content streams; processing the metadata to detect at least one target annotation within at least one target content stream; retrieving telemetry data associated with the at least one target content stream; processing the telemetry data and the metadata associated with a plurality of frames in the at least one target content stream to ascertain vector motion data; and mapping a spatial relationship associated with at least one capturing device associated with at least one target content source.

20 Claims, 13 Drawing Sheets

Related U.S. Application Data continuation-in-part of application No. 14/801,613, filed on Jul. 16, 2015, now Pat. No. 9,998,615, which is a continuation-in-part of application No. 14/612,671, filed on Feb. 3, 2015, now Pat. No. 10,230,995, which is a continuation-in-part of application No. 14/565,915, filed on Dec. 10, 2014, now Pat. No. 9,918,110.

(60) Provisional application No. 62/059,378, filed on Oct. 3, 2014, provisional application No. 62/026,475, filed on Jul. 18, 2014, provisional application No. 61/935,982, filed on Feb. 5, 2014, provisional application No. 61/915,783, filed on Dec. 13, 2013.

(51) Int. Cl.

| | | |
|---|---|---|
| *G06K 9/00* | (2006.01) | |
| *G11B 27/10* | (2006.01) | |
| *G11B 27/00* | (2006.01) | |
| *H04N 5/232* | (2006.01) | |
| *H04N 7/18* | (2006.01) | |
| *H04N 5/247* | (2006.01) | |
| *H04N 21/218* | (2011.01) | |
| *H04N 1/00* | (2006.01) | |
| *H04N 21/2187* | (2011.01) | |
| *H04N 21/43* | (2011.01) | |
| *H04N 21/845* | (2011.01) | |
| *H04N 21/84* | (2011.01) | |
| *A42B 3/04* | (2006.01) | |

(52) U.S. Cl.
CPC ............ *G11B 27/005* (2013.01); *G11B 27/10* (2013.01); *H04N 1/00209* (2013.01); *H04N 5/23238* (2013.01); *H04N 5/247* (2013.01); *H04N 7/181* (2013.01); *H04N 19/44* (2014.11); *H04N 21/2187* (2013.01); *H04N 21/21805* (2013.01); *H04N 21/4307* (2013.01); *H04N 21/84* (2013.01); *H04N 21/8455* (2013.01); *A42B 3/0433* (2013.01)

(58) Field of Classification Search
CPC ......... H04N 21/21805; H04N 1/00209; H04N 21/2187; H04N 21/4307; H04N 21/8455; H04N 21/84; H04N 19/44; H04N 5/23238; G06K 9/00744; G06K 9/00718; A42B 3/0433

See application file for complete search history.

(56) References Cited

U.S. PATENT DOCUMENTS

| | | | |
|---|---|---|---|
| 7,884,855 | B2 | 2/2011 | Ortiz |
| 8,184,169 | B2 | 5/2012 | Ortiz |
| 8,319,845 | B2 | 11/2012 | Ortiz |
| 8,504,061 | B2 | 8/2013 | Grainger et al. |
| 8,548,768 | B2 | 10/2013 | Greenwald et al. |
| 8,854,457 | B2 | 10/2014 | De Vleeschouwer et al. |
| 9,247,779 | B1 | 2/2016 | Aloumanis et al. |
| 9,266,017 | B1 | 2/2016 | Parker et al. |
| 9,389,677 | B2 | 7/2016 | Hobby et al. |
| 9,686,466 | B1 | 6/2017 | Billinghurst et al. |
| 9,782,660 | B2 | 10/2017 | Tawiah |
| 9,918,110 | B2 | 3/2018 | Anwar et al. |
| 9,998,615 | B2 | 6/2018 | Anwar et al. |
| 10,230,995 | B2 | 3/2019 | Anwar et al. |
| 10,375,424 | B2 | 8/2019 | Anwar et al. |
| 10,622,060 | B2 | 4/2020 | Anwar et al. |
| 10,728,584 | B2 | 7/2020 | Anwar et al. |
| 2005/0177853 | A1 | 8/2005 | Williams et al. |
| 2006/0128397 | A1 | 6/2006 | Choti et al. |
| 2007/0204302 | A1 | 8/2007 | Calzone |
| 2008/0109729 | A1 | 5/2008 | Notea et al. |
| 2009/0022172 | A1 | 1/2009 | Haberman et al. |
| 2010/0304931 | A1 | 12/2010 | Stumpf |
| 2011/0013087 | A1 | 1/2011 | House et al. |
| 2011/0205022 | A1 | 8/2011 | Cavallaro et al. |
| 2012/0108304 | A1 | 5/2012 | Horie et al. |
| 2012/0236544 | A1 | 9/2012 | Dorman |
| 2012/0304071 | A1 | 11/2012 | Hughes et al. |
| 2013/0070047 | A1 | 3/2013 | DiGiovanni et al. |
| 2013/0080531 | A1 | 3/2013 | Yoon et al. |
| 2013/0150684 | A1 | 6/2013 | Cooner |
| 2013/0162781 | A1 | 6/2013 | Hubner et al. |
| 2013/0178259 | A1 | 7/2013 | Strause et al. |
| 2013/0182116 | A1 | 7/2013 | Arima |
| 2013/0182119 | A1 | 7/2013 | Eledath et al. |
| 2013/0215281 | A1 | 8/2013 | Hobby et al. |
| 2013/0286959 | A1 | 10/2013 | Lou et al. |
| 2013/0303248 | A1 | 11/2013 | Williams et al. |
| 2014/0081428 | A1 | 3/2014 | Rudberg et al. |
| 2014/0181272 | A1 | 6/2014 | Abrams |
| 2014/0267747 | A1 | 9/2014 | Kritt et al. |
| 2014/0294366 | A1 | 10/2014 | Fletchall |
| 2014/0304891 | A1 | 10/2014 | Waters |
| 2014/0343984 | A1* | 11/2014 | Shahabi ........... G06Q 10/06311 705/7.13 |
| 2015/0046407 | A1 | 2/2015 | Kalas et al. |
| 2015/0066625 | A1 | 3/2015 | McDonald et al. |
| 2015/0067754 | A1 | 3/2015 | Wiser et al. |
| 2015/0074259 | A1 | 3/2015 | Ansari et al. |
| 2015/0085133 | A1 | 3/2015 | Teich et al. |
| 2015/0105159 | A1 | 4/2015 | Palotas |
| 2015/0145990 | A1 | 5/2015 | Jones |
| 2015/0149407 | A1 | 5/2015 | Abbott et al. |
| 2015/0172605 | A1 | 6/2015 | Anwar et al. |
| 2015/0177597 | A1 | 6/2015 | Harrison et al. |
| 2015/0189176 | A1 | 7/2015 | Pacurariu et al. |
| 2015/0222934 | A1 | 8/2015 | Anwar et al. |
| 2015/0254882 | A1 | 9/2015 | Englert et al. |
| 2016/0015109 | A1 | 1/2016 | Anwar et al. |
| 2016/0099025 | A1 | 4/2016 | Anwar et al. |
| 2017/0011598 | A1 | 1/2017 | Strause et al. |
| 2017/0232351 | A1 | 8/2017 | Thompson |
| 2018/0176608 | A1 | 6/2018 | Anwar et al. |
| 2018/0176661 | A1 | 6/2018 | Vamdell et al. |
| 2018/0270368 | A1 | 9/2018 | Anwar et al. |
| 2019/0208232 | A1 | 7/2019 | Anwar et al. |
| 2020/0359058 | A1 | 11/2020 | Anwar et al. |

OTHER PUBLICATIONS

European Search Report dated Feb. 27, 2015 cited in 14197499.8, 9 pgs.
U.S. Non-Final Office Action dated Jan. 30, 2017 cited in U.S. Appl. No. 14/801,613, 21 pgs.
U.S. Non-Final Office Action dated Jun. 14, 2017 cited in U.S. Appl. No. 14/565,915, 9 pgs.
U.S. Final Office Action dated Oct. 4, 2017 cited in U.S. Appl. No. 14/801,613, 27 pgs.
U.S. Non-Final Office Action dated Jan. 17, 2018 cited in U.S. Appl. No. 14/612,671, 16 pgs.
U.S. Final Office Action dated Jul. 3, 2018 cited in U.S. Appl. No. 14/612,671, 14 pgs.
U.S. Non-Final Office Action dated Aug. 24, 2018 cited in U.S. Appl. No. 15/988,056, 20 pgs.
U.S. Non-Final Office Action dated Oct. 19, 2018 cited in U.S. Appl. No. 15/883,972, 12 pgs.
U.S. Final Office Action dated Feb. 28, 2019 cited in U.S. Appl. No. 15/988,056, 21 pgs.
U.S. Non-Final Office Action dated Sep. 25, 2019 cited in U.S. Appl. No. 15/988,056, 21 pgs.
U.S. Non-Final Office Action dated Nov. 19, 2019 cited in U.S. Appl. No. 16/299,123, 22 pgs.

* cited by examiner

POINT OF VIEW VIDEO PROCESSING AND CURATION PLATFORM

RELATED APPLICATIONS

The present application is a continuation of U.S. application Ser. No. 14/870,101, filed Sep. 30, 2015, which issued on Apr. 14, 2020 as U.S. Pat. No. 10,622,020; which is a Continuation-In-Part of U.S. application Ser. No. 14/801, 613 filed Jul. 16, 2015, which issued on Jun. 12, 2018 as U.S. Pat. No. 9,998,615; which is a Continuation-In-Part of U.S. application Ser. No. 14/612,671 filed Feb. 3, 2015, which issued on Mar. 12, 2019 as U.S. Pat. No. 10,230,995; which is a Continuation-In-Part of U.S. application Ser. No. 14/565,915 filed Dec. 10, 2014, which issued on Mar. 13, 2018 as U.S. Pat. No. 9,918,110; which claims benefit under the provisions of 35 U.S.C. § 119(e) of U.S. Provisional Application No. 62/059,378 filed Oct. 3, 2014, which claims benefit under the provisions of 35 U.S.C. § 119(e) of U.S. Provisional Application No. 62/026,475 filed Jul. 18, 2014, which claims benefit under the provisions of 35 U.S.C. § 119(e) of U.S. Provisional Application No. 62/935,982 filed Feb. 5, 2014, which claims benefit under the provisions of 35 U.S.C. § 119(e) of U.S. Provisional Application No. 61/915,783 filed Dec. 13, 2013, which are all incorporated herein by reference in their entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to point of view multimedia processing.

BACKGROUND

The current state-of-the-art of video and audio capture, processing, and delivery may involve, for example, multiple capturing cameras and microphones throughout a venue. In the typical setup, each venue camera may be associated with a broadcast feed that can be selected for transmission to entities within the venue or entities in remote proximity to the venue. In conventional systems, video may be captured, stored and/or streamed using, for example, internet or internet-like protocols.

BRIEF OVERVIEW

A Point of View (POV) video processing and curation platform may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide methods and systems enabled to perform the following stages: receiving a plurality of content streams; retrieving metadata associated with each of the plurality of content streams; processing the metadata to detect at least one target annotation within at least one target content stream; retrieving telemetry data associated with the at least one target content stream; processing the telemetry data and the metadata associated with a plurality of frames in the at least one target content stream to ascertain vector motion data; and mapping a spatial relationship associated with at least one capturing device associated with at least one target content source.

Embodiments of the present disclosure may provide methods and systems enabled to receive a plurality of streams comprising at least one video stream and at least one telemetry data stream associated with the at least one video stream; and create metadata corresponding to the at least one video stream and the at least one telemetry data stream, wherein creating the metadata comprises: processing at least one frame of the at least one video stream to detect at least one artifact within the frame, processing the at least one telemetry data stream to determine telemetry data associated with the at least one frame of the at least one video stream, and annotating the at least one artifact and the telemetry data associated with the at least one frame. Further, the methods and systems may be enabled to receive the metadata and the corresponding at least one video stream for a plurality of video streams; and process the plurality of video streams to create a logical view. The processing may be based on a plurality of algorithmic processing rules for creating the logical view. Logical views may also be referred to as "Sport of View™".

Embodiments may provide methods and systems configured for:
  receiving a plurality of content streams;
    wherein the plurality content streams comprises a plurality of frames;
      wherein the plurality of frames correspond to data captured by a plurality of content capturing sources;
        wherein the plurality of content capturing sources are further configured to capture telemetry data;
        wherein the plurality of content capturing sources are further configured to capture audio data;
        wherein the plurality of content capturing sources comprise a wearable video and audio capturing means;
          wherein the wearable camera is worn by a participant in a sporting event;
        wherein the plurality of content capturing sources comprises an event video and audio capturing means;
          wherein the event camera is capturing the sporting event
  retrieving metadata associated with each of the plurality of content streams;
    wherein the metadata comprises annotations associated with at least one of a plurality of frames within each content stream;
      wherein the annotations comprise at least one target annotation indicating an existence of an artefact in a corresponding frame;
        wherein the at least one target annotation is specified based on at least one processing rule;
        wherein the artefact is specified based on the at least one processing rule;
          wherein the at least one processing rule is based on a desired output stream;
  processing the metadata to detect the at least one target annotation;
    wherein the processing to detect the at least one target annotation is performed across the plurality of content streams;

wherein detecting the at least one target annotation in more than one of the plurality of content streams indicates the presence of the artefact in at least one frame of each of the corresponding target content streams;
wherein the processing to detect the at least one target annotation is performed in a context of at least one processing rule;
wherein the at least one processing rule is based on a desired output stream;
wherein the processing to detect the at least one target annotation comprises the processing of telemetry data;
wherein the telemetry data comprises at least one of the following: vector data, motion data, and location data;
wherein processing the telemetry data further comprises processing the metadata of additional content sources;
wherein the processing is performed:
on a per rule basis;
in a parallel basis for a plurality of rules;
wherein the plurality of rules are associated with a plurality of output streams;
determining content sources associated with each target content stream;
wherein at least one content source is associated with at least one player in a sporting event;
wherein the at least one content source is associated with a wearable camera worn by the at least one player in the sporting event;
further comprising:
determining at least one proximate content source in spatial proximity to each content source associated with each target content stream;
wherein processing the telemetry data further comprises determining at least one proximate content source in spatial proximity to each content source associated with each target content stream;
wherein processing the telemetry data further comprises determining, based on telemetry vector data, a subsequent content source in relation to a projected appearance of the artefact in a frame associated with the subsequent content source;
wherein processing the telemetry data further comprises determining at least one proximate content source in spatial proximity to each subsequent content source;
retrieving telemetry data associated with the corresponding target content stream provided by each content source;
wherein the telemetry data is retrieved from the metadata;
wherein the telemetry data is retrieved from the metadata associated with each frame comprising the at least one target annotation in the metadata;
wherein the telemetry data is associated with each frame comprising the at least one target annotation in the metadata;
further comprising:
retrieving telemetry data associated with a corresponding target content stream provided by each proximate content source;
processing the telemetry data and the metadata associated with a plurality of frames in each target content stream to ascertain vector motion data;
wherein the vector motion data provides data related to the relevant motion of each content sources corresponding to each target content stream;
wherein the vector motion data provides data related to the relevant motion of at least one proximate content source in special proximity to each content sources corresponding to each target content stream;
wherein the processing is performed for the frames in which the artefact was indicated;
wherein the processing is further performed for the surrounding frames in addition to the frames in which the artefact was indicated;
wherein the processing is performed for one or more frames in a proximate content stream captured by the at least one proximate content source
wherein the processing is performed:
on a per rule basis;
in a parallel basis for a plurality of rules;
wherein the plurality of rules are associated with a plurality of output streams;
mapping a spatial relationship between the target content sources;
wherein the mapping is based on, at least in part, the vector motion data;
wherein the spatial relationship is configured to enable an indication, for each content source, at least one of the following:
a past position, a present vector, a future position
wherein the vector motion data comprises predictive motion data;
wherein the predictive motion data indicates a propagation vector and velocity that a content source is predicted to propagate;
wherein the spatial relationship indicates the spatial relationship between the artefact, the target content sources, and the at least one proximate content source;
wherein the spatial relationship indicates the spatial relationship between the artefact, the target content sources, and the at least one proximate content source;
wherein the mapping is performed:
on a per rule basis;
in a parallel basis for a plurality of rules;
wherein the plurality of rules are associated with a plurality of output streams;
Embodiments may further comprise methods and systems configured for:
processing image data within the plurality of frames to ascertain vector motion data for the artefact;
wherein the artefact comprises a competitive element within a sporting event;
determining at least one projected content source in proximity to a trajectory of the artefact;
wherein the trajectory is based on, at least in part, the vector motion data;
ascertaining vector motion data of the projected content source, and
mapping the spatial relationship between the target content sources and the projected content source;
mapping the spatial relationship between the target content sources, the at least one projected content source, and the at least one proximate content source;

mapping the spatial relationship between the artefact, the target content sources, the at least one projected content source, and the at least one proximate content source.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1A:
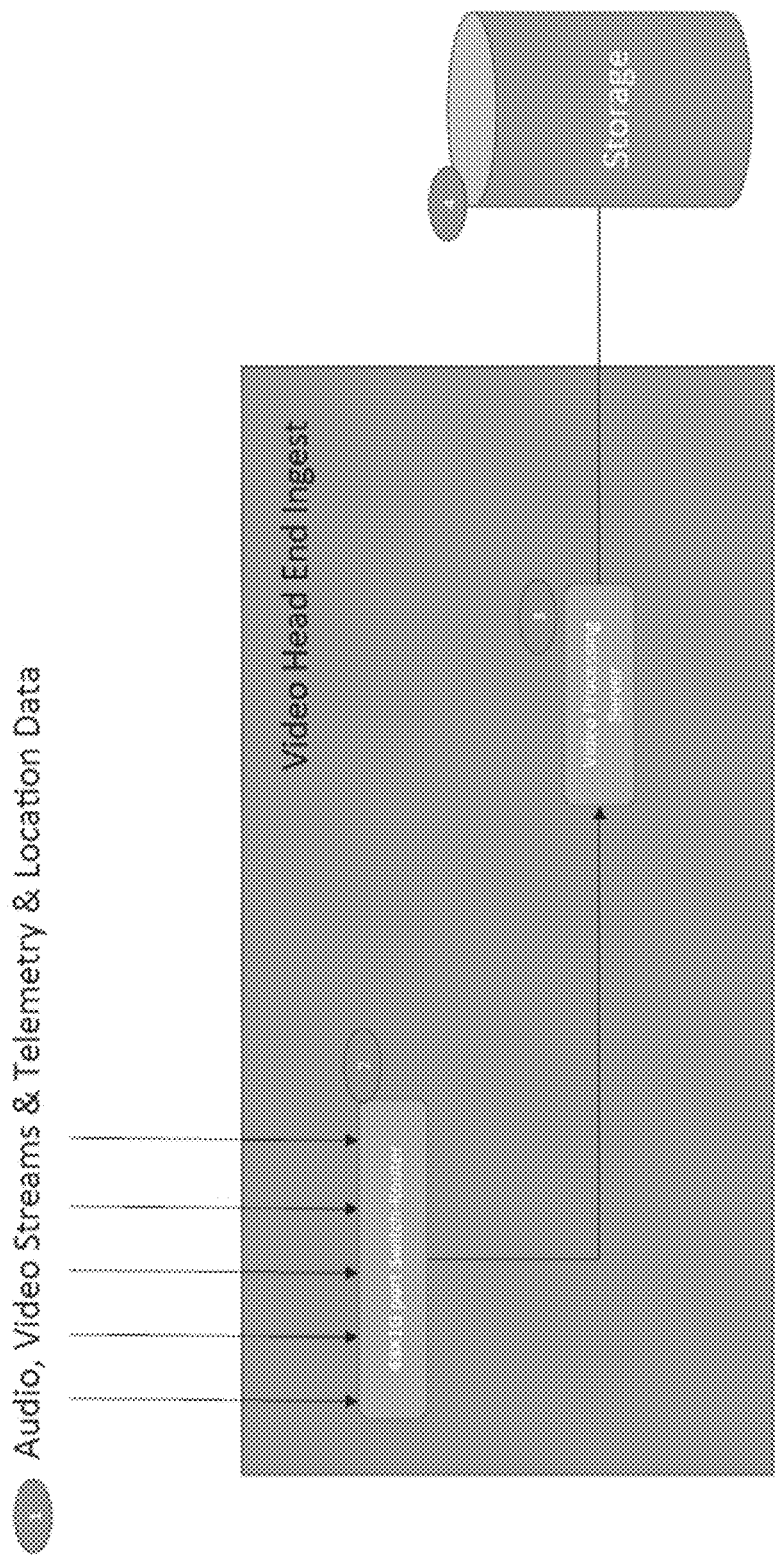
FIG. 1A illustrates an embodiment of a Video Head-End architecture.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods.

Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of sports, embodiments of the present disclosure are not limited to use only in this context. For example, the platform may be used in military applications, adult film industry applications, and cinematic production applications.

I. Platform Overview

Consistent with embodiments of the present disclosure, a Point of View (POV) video processing and curation platform may be provided. This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure are associated with the capture, processing and curation of POV video for storage and distribution. (See U.S. patent application Ser. No. 14/565,915, (hereinafter referenced as ''915'). The POV platform of the present disclosure may further be associated with the provision of POV content to end-users and entities. (See U.S. patent application Ser. No. 14/612,671, hereinafter referenced as '671'.) Accordingly, the various capture, processing, and streaming embodiments described herein may be integrated with the POV platform described in '915 and '671.

As described in '915, a video head-end in a POV platform may receive at least one video feed captured from at least one video capturing device (among other feed types and capturing device types). The capturing devices may be integrated into, for example, a helmet. (See U.S. patent application Ser. No. 14/801,613, hereinafter referenced as '613'.) Thus, each time the present disclosure makes reference to a helmet, a data generator, a capturing apparatus, a sensing device, or any other data/content source may incorporate the disclosure of '613.

Moreover, the present disclosure contains various systems and methods for content stabilization, storage, stitching, and building of metadata for each captured stream arising out of a content source. These systems and methods may be employed, based on video processing rules, for the curation of new video stream. As will be detailed below, the systems and methods may employ, for example, content metadata to provide the new curated video in response to platform user selections. In addition, embodiments of the present disclosure provide for the use of standard industry networking hardware and to enable the processing of the video streams (as applicable to, for example, either single or multi-cast video streams).

Using an integrated communications module, the capturing apparatus (e.g., helmet) may provide a transport stream to the POV platform. Details on the transport stream are provided in the '613 application and are incorporated herein by reference. The stream may be received through a network infrastructures within a venue. The network infrastructure may be configured to include various connections and protocols. For example, various connections and protocols may be used, including, but not limited to, Wi-Fi, potentially a Bluetooth to Wi-Fi bridge, Wi-Fi access points, Power over Ethernet (PoE) switches, and the local switch router at a video-head-end. Details on the communication protocols are provided in the '915 application and are incorporated herein by reference.

The transport streams may comprise audio and video transport streams, as well as any location and telemetry data associated with the content sensing and generation apparatus (e.g., the helmet as described in '613). Although conventional networking infrastructure may be employed with the various embodiments of the present disclosure, the switch router and other video head-end components are detailed herein to illustrate a possible embodiment for processing the POV audio and video streams.

The video head-end consistent with embodiments of the present disclosure may receive the transport streams and process the transport streams. Accordingly, the video head-end may operate in, for example, three layers. A first layer may comprise an ingestion stage to store the received video streams. A second layer may comprise a processing stage to process the video stream, thereby producing a curated video content. The third layer may comprise a streaming stage in which the curated content may be streamed to a destination or multiple destinations via multi-cast protocol. This multi-cast stream may be consumed within a stadium or external to a stadium via a Content Delivery Network (CDN) as described in '915 and '671. In this way, a Sport of View™ stream may be provided as will be detailed in further detail herein.

A venue in which the content streams may be captured (e.g., a sports stadium) may have a locally residing video head-end interface. In some embodiments, however, portions of the head-end may reside local to the venue, while other portions may reside remote to the venue. By way of non-limiting example, the ingestion layer may be located within the venue, while the processing and transmission layers may be located outside of the venue.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Media Streams and Head-End Infrastructure

Embodiments of the present disclosure shall be described with reference to a POV Platform being provided at a sports venue hosting a football game. Such venue is used for illustrative purposes and the various embodiments are not limited to exclusively such venue. Rather, a non-exhaustive listing of applications in which the various embodiments may be implemented is described in section IV of this disclosure, infra.

Accordingly, embodiments of the present disclosure may be configured to receive a plurality of feeds captured from a helmet integrated with a plurality of capturing devices. (e.g., with reference to the '613 application). The capturing devices may comprise, for example, but not be limited to, four video capturing devices (it is preferred, although not essential, that four video feeds may be a sufficient number of feeds such that, when each feed is stitched together, a POV video may be produced with the perspective of a player wearing the helmet). In turn, the four video capturing devices may provide a head-end interface with four video feeds. It should be understood that the amount of capturing devices is used for illustrative purposes only and that a plurality of capturing devices may be used.

Furthermore, and as detailed in '613, the integrated helmet may comprise an additional capturing device directed toward the players face. The player-facing capturing device may be configured to provide a plurality of successive images (i.e., burst shots). Assuming that each player actively playing on the football field is wearing an integrated helmet, a total of 22 burst shot feeds may be provided from the player-facing capturing device.

As a whole, there may be 44 players including those players that are benched and not active on the playing field. In some embodiments, the POV platform may process the feeds captured by the corresponding players' integrated helmets. However, for the sake of saving resources, including battery power, the integrated helmet corresponding to players not on the field may be signaled to operate in a passive state (by turning off some of the electronics when a player is off the field, e.g., cameras, Bluetooth, Wi-Fi, and the like). Such signal may be triggered automatically when based on player location (as detected by the integrated helmet), or manually by a POV platform operator. For instance, multiple methods of detecting if a player is on/off the field include the use of RFID sensors in the helmet, GPS location, Wi-Fi location (external to the helmet), etc. In some embodiments, RFID tags may be placed on blankets, benches, tunnels, emergency carts, etc. to assist in player location detection. Further details may be provided in the '613 application.

As described in patent '915, the content and data captured by the integrated helmet may be transported over the Wi-Fi network using Wi-Fi access points, and PoE switches. The Ethernet feeds from the PoE switches may be connected to the head-end switch router. As illustrated in FIG. 1A, the audio and video streams along with telemetry and location data are shown as label 1. These streams are received by a multi-cast switch-router, label 2. This multi-cast switch router may also be used to multi-cast any streams from the head-end to within the stadium or to a CDN outside of the stadium, as further detailed in the '971 application.

The video processing server, label 3, may receive the streams and process the streams. Video processing is further detailed with reference to section IV, infra. The processed streams may be stored as audio and video streams in a storage, label 4. The storage may be, for example, but not limited to a SAN, RAID type storage preferably using solid state disks (SSD) for fast access & retrieval of files and database.

Figure 1B:
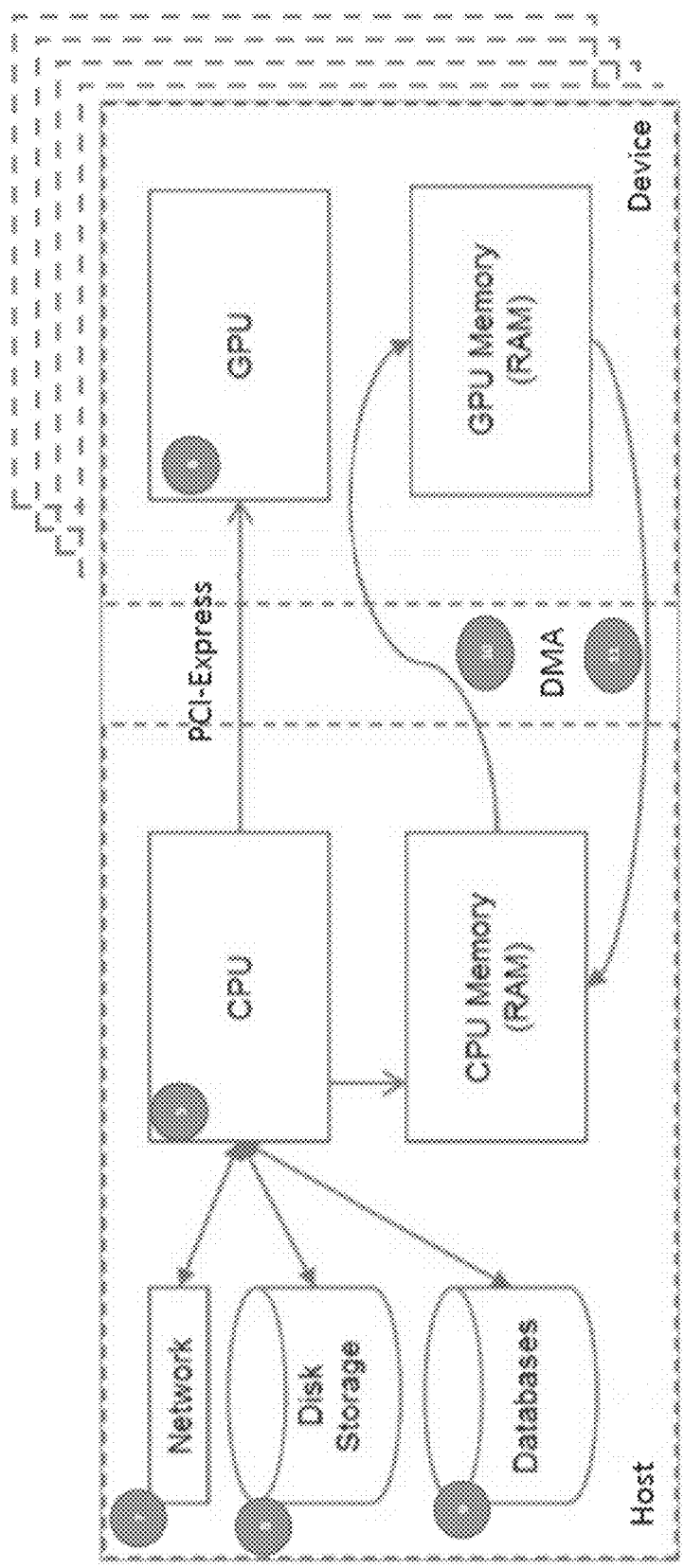
FIG. 1B illustrates an embodiment of a Video Processing Server.

FIG. 1B shows a video-processing server consistent with embodiments of the present disclosure. The server may be, for example, an industry standard server comprising of multi-core CPU, label 5, and multi-core GPU, label 6. The combination of CPU and GPU processing allows the head-end to process multiple media streams in parallel (similar to a multi-cast method). The CPU and GPU cores may communicate through memory, CPU ram and GPU ram, respectively. It should be understood that other computing device architectures would be possible with embodiments of the present application (e.g., computing device 1200).

The two-way communications is shown by labels 10 and 11, via direct memory access (DMA) which could use standard PCI express methods known in modern day computers. In various embodiments, the CPU may communicate directly or via PCI express with the network access, label 7, to send and receive the media streams. The CPU may also communicate directly or via PCI express with the disk storage, label 8, and the database, label 9.

III. Raw Telemetry Data and Video Storage

Figure 2:
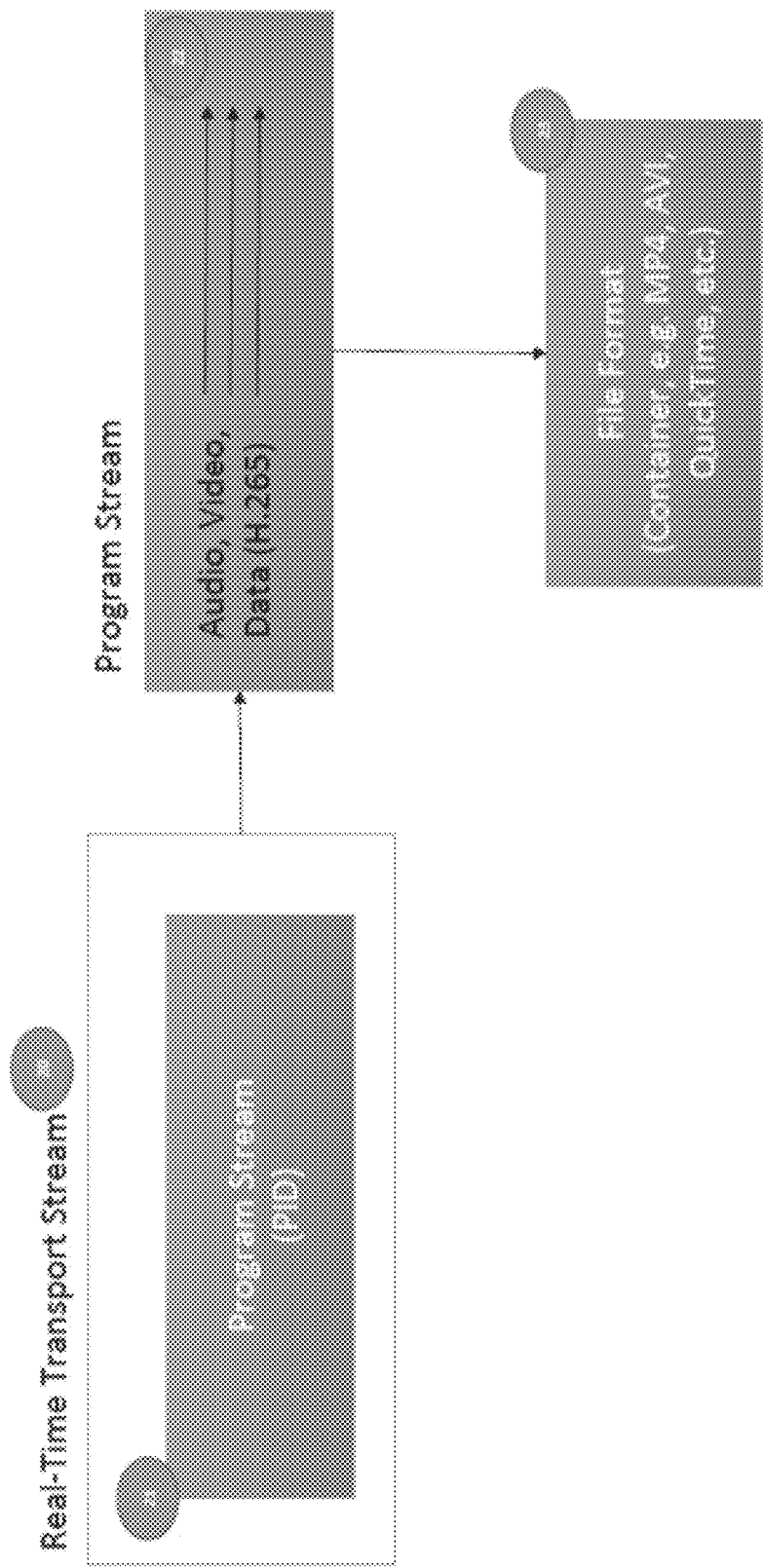
FIG. 2 illustrates an embodiment of a Video File Storage processing architecture.

Referring back to FIG. 1A, the Video Processing server 3, may receive the media stream and associated sensor data, such as GPS, RFID, temperature, and others disclosed in '613. FIG. 2 illustrates Video Processing server 3 receiving a Transport Stream 20. Although in some embodiments the sensor and a/v data (media stream) may be communicated in, for example, separate streams, some sensor data may be integrated in the media stream, such as EXIF data to form the transport stream. Although transport stream 20 is labeled as a 'real-time' transport stream, embodiments of the present invention may be compatible with non-real time data communication.

Separate telemetry information may be received as Internet data packets and processed directly by the CPU. The CPU updates the metadata in the database, (See FIG. 1B label 9) with telemetry information such as, but not limited to, RFID tag info, Assisted GPS information, Temperature, a plurality of degrees (e.g., six) of acceleration, a plurality of degrees (e.g., six) of gyro information for tilt, etc. Some of this information, such as acceleration and gyro information, may be received continuously and is synchronized with the A/V feed using time stamp information. Since each frame may be processed at, for example, 60 frames per second, this telemetry information may be averaged over several frames because of inherent latency in this type of information.

The video processor may extract the program stream, label 21, from the transport stream. The encoded media files, label 22, may be extracted from the program stream and placed in a file container, label 23, suitable for memory and disk storage. Still pictures may have embedded data (e.g., EXIF or XMP information). The transport stream of the present disclosure may be a container for the program stream so it can be transported over Wi-Fi. In some embodiments, the transport stream may be transmitted in blocks for later reconstruction of the streamed blocks. The program stream may comprise the A/V data. External sensor information (e.g., telemetry data) may be transported directly as IP data packets over Wi-Fi.

The file containers may remain open such that as new video blocks are received, the video block files may then be appended to the open containers in memory and disk storage. The encoded media files may be in an industry standard format such as H.265/HEVC encoding.

Consistent with embodiments of the present disclosure, all communicated and stored data (e.g., the streamed media, data files and memory/disk files) may be associated via the MAC/IP address of the source of captured content (e.g., helmet). For example, each player on and off the field will have a unique MAC/IP address combination. The video process will be provisioned ahead of time with this information. All memory and disk files may be marked with such designation as well as which camera the media feed was sourced from. The marking may be in the form of, for example, metadata.

Each player during a football game may require identification for source of video, audio and telemetry information. In some instances, each player may typically have two helmets at the game and each helmet may have a wearable system that can be replaced. In the metadata structure, embodiments of the present disclosure may have allocated space for multiple addresses of the wearable systems (i.e., 4 MAC addresses). The MAC addresses may require entry before the game starts by platform operation personnel. The IP addresses may be automatically allocated when the MAC addresses communicate with the head-end. This may enable the head-end to identify which of the streams need to be stitched, such as, for example, the ones received from the same MAC address. If a wearable system is replaced with the player's second helmet, this may be automatically detected by the head-end since the second helmet may also be previously allocated for that player. This information (as further detail in the '613 application) may be fed by the rules engine as further detailed in the '915 application.

IV. Video Processing

Embodiments of the present disclosure may provide rule-based video processing. As described in '915, there may be multiple scenarios during a game as well as after the game to generate the requested user experience. Such requests may include, but not be limited to, videos from individual cameras, 360 degree (or an otherwise wide-angle) panoramic views from each player, or sequenced views on an interest of focus (hereinafter referred to as 'Sport of View™'). In '915, aggregated 3D & panoramic views are discussed. Such views may be encompassed within Sport of View™.

Accordingly, video processing may entail the various combination and sequential application of the various capturing devices, each associated with, for example, different sources (e.g., helmets), to provide a requested view. Such combination and application may be derived from the rules for a particular requested view. In this way, video processing may be employed to provide the requested view.

The view may be requested by an end user of the platform (e.g., an audience member, either local or remote to the venue). In some embodiments, views may be requested by platform operators, venue administrators, event officials (e.g., referees), event participants (e.g., players and coaches).

The rules on which video processing may be based may be referred to as 'business rules', although the rules may not be based on the typical business methods. Business rules may be powered by, for example, a rules engine as further detailed in the '915 application. Business rules for Sport of View™ may include, but are not limited to, for example:

1. Focus on the ball during a pass play for both short pass and long pass;
2. Focus on the ball during a run play providing multiple types of view, e.g., nearest to the ball, etc.; and
3. Focus on individual players in both offense and defense positions.

In some embodiments, Sport of View™ videos may be used to capture additional footage that may be used for other commercial applications and programs such as advertisements, team promotions, replays, and other applications for video. In these, such Sport of View™ focus may be associated with:

1. Brand icons, such as Gatorade, Nike, Riddell, etc.;
2. Referees;
3. Team Staff;
4. Team Owners;
5. Cheerleaders; and
6. Fans, unique individuals.

In addition, the Sport of View™ videos may be programmed to provide feedback to coaches on how well their playbook is being executed. For example, the views may be configured such that the focus would be on quarter back timing, i.e., number of steps, followed by a short pass or a long pass, etc.

In the various embodiments disclosed herein, video processing may begin with decoding the individual video feeds. As discussed supra, individual video feeds may be encoded, e.g., H.265 encoding. Accordingly, these feeds may be decoded to get a pixel map of each frame. Once the frame is recovered, then video processing may ensue. For individual camera selected for viewing, there may be no need to decode because these feeds are already captured in H.265 containers.

a. Individual Camera Feeds

In some embodiments, video processing for individual camera feeds may not be required. For example, the individual camera video feed may optionally be transcoded in H.264 or H.265 formats, if required, and streamed out. The process of streaming is in reverse order as shown in FIG. 2. For example, for an individual camera stream embodiments may store the video in a file container but the encoded video may still be in the original form it was captured in. So, to stream this video, the flow in FIG. 2 may be reversed. The 'reverse order' may be understood as follows. Embodiments may extract the encoded video from the file container and place it in the program stream container which may then be placed inside the transport stream container to send out over the Internet CDN or locally in stadium over Wi-Fi. A suitable naming convention may be applied to each curated file (container), e.g., "Player 1-Cam 1", or "MAC Address 1-Cam 1", etc.

However, in some embodiments, the video feed may be decoded, and processed with algorithms that may apply, for example, but not be limited to, the following techniques before re-transmission:

Stabilization: This is the reduction in jitter in up-down, and left-right direction due to shaking. Information to stabilized may be available in the metadata for each frame e.g., acceleration and gyro information.

Color & Polarization. This is the correction of color exposure due to polarization effects produced during capturing of video. Polarization effects show as bands of over exposure or under exposure.

Interposition: Position differences and occlusions between different objects in the scene may indicate relative depth of the objects.

Linear Perspective: Explicitly seen edge or any linear perspective source may lead to the perception of depth in terms of the given regular subject sizes or learned perspective feeling.

Relative and Known Size: Comparison of known sizes of two objects may provide the feeling of 3D depth as their relative sizes differ. Two of the same objects with different sizes may imply that the object that appears smaller is farther away.

Texture Gradient: Texture of same size and shapes may indicate whether there is any distortion on that plane as a linear perspective or not.

Light and Shadow Distribution: Light and shadow distribution in the scene may provide different clues about the depth of the objects. Just lighting and shadow appearance of an object may carry information on its 3D location.

Aerial Perspective: Different artifacts such as blurriness, dust, humidity or fog may imply depth information. For example, in natural landscape images, the farther the scene object gets, the blurrier the image may become.

Whereas if the focus is distance, near objects may be blurred. In some case, both near and far objects may be in focus.

b. Panaramic Feeds and Building of Metadata

As mentioned supra, before a plurality of individual feeds can be stitched, the individual video feeds may be decoded to recover the pixel format. These feeds (which may be encoded in, for example, but not limited to, H.265 encoding) may be decoded to get a pixel map of each frame within the feed. Referring back to FIG. 2, the program stream (i.e., the feed) may be comprised of A/V content and Data content. The A/V content of the steam may be decoded to establish the pixel map. The pixel map may be created for, in some embodiments, each frame. Once the frame is recovered, then video processing can ensue.

A stitched file (e.g., a larger frame comprised of the individual frames) may be constructed and corrected using non-limiting industry standard heat map methods and depth map techniques and similar methods of matching pixels and motion vectoring. The techniques of section (a) may be employed in the processing.

Optionally panoramic views may be streamed out without any further processing. In this case, the larger frames are encoded back into an H.265 or H.264 format and placed in a file container for storage, as well as placed into a program stream container for streaming out (reverse process as shown in FIG. 2). A suitable naming convention will be applied to each curated file (container), e.g., "Panoramic-Player 1", or "Panoramic-MAC Address 1", etc. Panoramic views are streamed as large (jumbo) frames. These may be rendered in an application suitable for viewing these jumbo frames.

Figure 3:
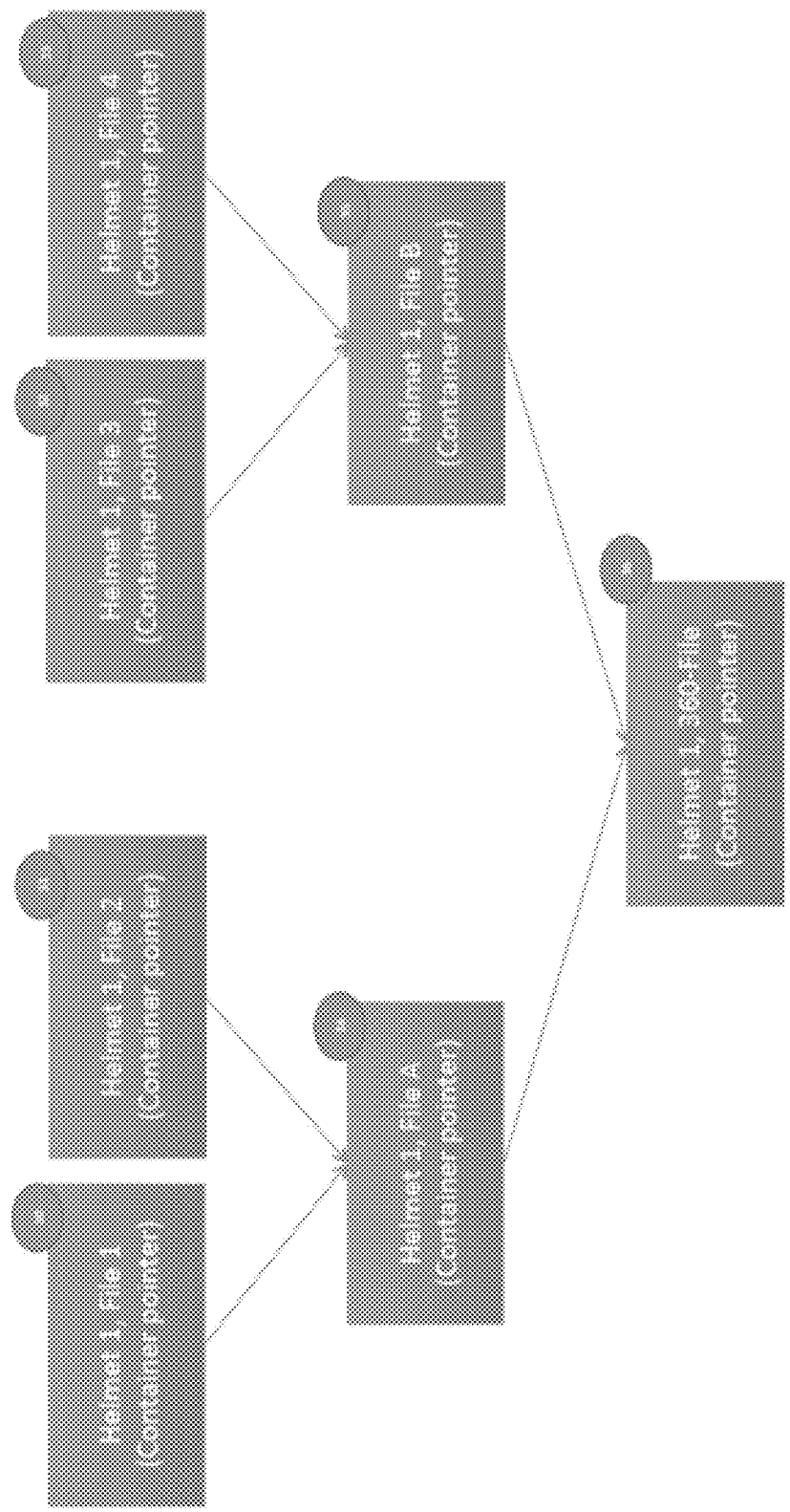
FIG. 3 illustrates an embodiment of a Video Stitching method.

FIG. 3 illustrates an embodiment of how four camera feeds, labels 30, 31, 32 and 33, from a helmet are processed to provide a 360 panoramic view (hereinafter, the 360 panoramic view may be used to express any degree of a wide-angle view). For example, the first two feeds may be stitched and the last two feeds may be stitched to produce stitched feeds, labels 34 and 35. In turn, these stitched feeds may be stitched to create one 360 panoramic view, label 36. At each step, labels 24, 35, and 36, the techniques of section (a) may be employed in the processing.

Once the video frames are stitched into a 360 panoramic view and processed for stability and other algorithms described in section (a) above, the video frames may be scanned for metadata by multiple GPUs. The scan may iterate to determine, by way of non-limited example, the location within the frame, distance from object, etc.:
1. Ball;
2. Snap;
3. Player faces, once for each player;
4. Player Shirts, once for each player;
5. Side lines;
6. Line markers, down markers; and optionally any other markings such as infrared markers, non-visible paint to human eyes, etc.;
7. Hash-Mark lines;
8. 5-Yard and 10-Yard lines, End;
9. End-Zone lines;
10. Uprights; and
11. Game clock.

In some embodiments, these frames may further be scanned for, but not limited to:
1. Brand icons, such as Gatorade, Nike, Riddell, etc.;
2. Referees;
3. Team Staff, Coaches, Bench players, Medics;
4. Team Owners, Players family/wives;
5. Cheerleaders; and
6. Fans, several times for unique individuals.

All of the aforementioned elements may be derived from the frames and encoded as metadata. After processing to determine the metadata, the stitched streams may be transcoded in H.265/H.264 formats, stored and streamed out. A suitable naming convention will be applied to each curated file (container), e.g., "Panoramic-Player 1", or "Panoramic-MAC Address 1", etc. In some embodiments, the decoded streams may be kept in memory if further processing is required, i.e., 'sport of view' videos.

c. Metadata

Figure 4:
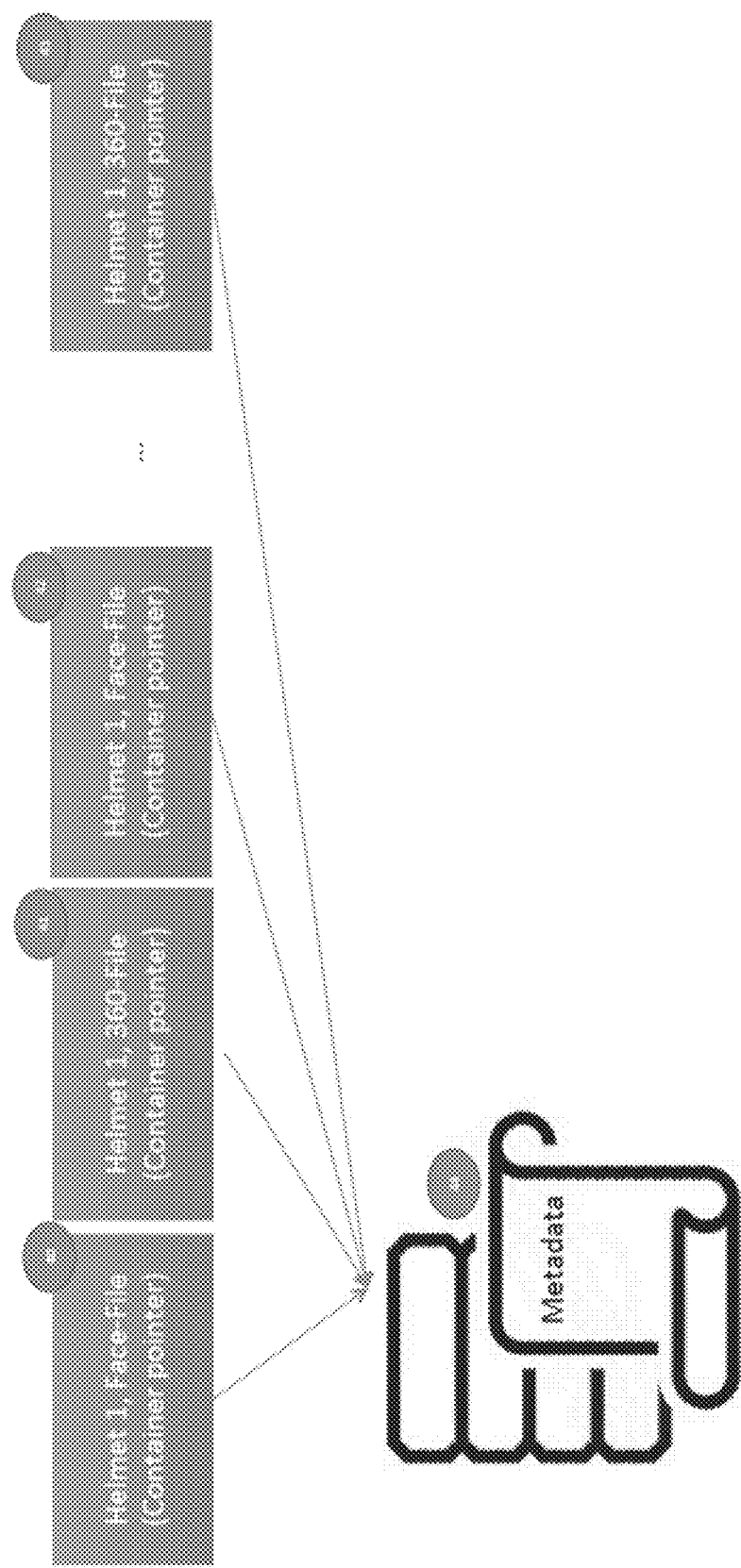
FIG. 4 illustrates an embodiment of Metadata Scanning architecture.

FIG. 4 illustrates selected scans for the points of interest in various point of views. The scans may be performed by a processing unit such as, for example, but not limited to, the aforementioned GPU. Consistent with various embodiments of the present disclosure, the metadata blocks may made available before any requested view is processed. The GPU may scan both the stitched panoramic video blocks (bit maps), labels 41 and 43, as well as the still images (pixel maps) from the face camera in burst mode, labels 40 and 42. All the scanned information may be stored in a database, label 44.

Metadata may be comprised of three blocks: one block may contain data for the player and information related to the wearable helmet system, as well as any information to catalog the event; a second block may contain information captured from the still camera; and a third block may be related to the panoramic video motion. The still camera block may also contain information that doesn't require fast capture, e.g., helmet and battery temperature, assisted GPS information, electronics control information based on whether the player is on or off the field and any information related to eye movement or eye dilation. Each frame is associated with this information. Alerts may be triggered using this information for ensure correct operation of the helmet electronics as well as eye dilation information for medical reasons. The still camera block may also contain the number of frames recorded for this block and where these frames exist within the file container for the still camera. These frames may then be used to see the condition of players' eyes and face in medical issues such as concussions. The panoramic video block may contain the frames recorded for the video stream in manageable chunks. Since this may all be processed in real time and the stream is at 60 fps, video may be processed in a series of video frames. The series of video frames may be stored in the metadata block and indicate where these frames exist in an A/V file container. Along with this information, the metadata may be marked to show if a frame contains objects (and location within the jumbo frame) of interest such as, for example, but not limited to:
1. Ball;
2. Snap;
3. Player faces, once for each player;
4. Player Shirts, once for each player;
5. Side lines;
6. Line markers, down markers; and optionally any other markings such as infrared markers, non-visible paint to human eyes, etc.;
7. Hash-Mark lines;
8. 5-Yard and 10-Yard lines, End;
9. End-Zone lines;
10. Uprights; and
11. Game clock.

Additional information may also be collected in the database to help with rules processing such as the acceleration in, for example six degrees, gyro tilt in six degrees. This additional information may be used to stabilize the video as well as provide alerts for concussions based on the 6 degrees of acceleration.

The location of an object in a frame may be required for processing of panoramic video. For example, if the focus is the ball, then each frame will be centered on the ball and cropped for normal frame size consumption, such as 1920 by 1080 pixels. This cropped frame may then be used for encoding, sequencing (temporal stitching) and streaming. This is explained more in the sport of view section, infra.

The video panoramic metadata block may also contain information on the captured 'speech to text' audio for the block of video frames. This audio can be used to compare huddle calls and line of scrimmage calls against a playbook. Such an application may be useful for coaching requirements.

The interaction of metadata with the business rules engine further detailed in the '915 application may be in stages. Initially, the rules engine may expose what objects of interest are available. This may allow new objects to be added over time. The operator of the business rules may enter which objects should be processed during the game.

Another set of rules may allow the operator to curate temporally stitched video based on the captured objects, e.g., nearest to object, closest to a player, closest defender to the running back, etc. These rules may allow the business rules engine to scan the metadata and find the sequence of frames to process, i.e., temporal stitching.

It is anticipated that $3^{rd}$ parties such as CBS, ESPN, or $3^{rd}$ party application providers etc. may want direct access to the rules engine post-game. In this case, the curation of the stages described above may be through a published API.

Any metadata that shall be made available to external applications may be provided through published API. The metadata blocks may include the following fields described in the tables below but is not limited to these fields, and may also contain different points of interest for other sports, e.g., below are examples for football and baseball:

|  | VALUE |
|---|---|
| HEADER | |
| Sport Type | NHL, NCAA Football, MLB, NCAA Baseball, etc. |
| Season | Fall 2014 |
| Tournament | Main Season, Playoffs, Rose Bowl, etc. |
| Date | |
| Home Team | |
| Away Team | |
| Player Name | |
| Player Shirt Number | |
| Offense/Defense | |
| Position | QB, RB, etc. |
| Special Teams Position | |
| Player Face Picture File | File for facial recognition |
| Wearable 1 MAC Address | |
| Wearable 1 IP Address | |
| Wearable 2 MAC Address | |
| Wearable 2 IP Address | |
| Wearable 3 MAC Address | |
| Wearable 3 IP Address | |
| Wearable 4 MAC Address | |
| Wearable 4 IP Address | |
| FOOTBALL CONTROL DATA & IMAGE BLOCK | |
| Bitmap Frames Container | File location |
| Index for Frame Block | Index in File Memory Location |
| Number of Frames | |
| H.265 Container | |
| Start Index of Burst Block for H.265 container | |
| End Index of Burst Block for H.265 container | |
| FRAME META DATA (for Each Frame) | |
| Time Stamp | |
| On-Field/Off-Field | RFID tags on benches and tunnels |
| Off-Field Face Camera on/off | |
| Off-Field Cameras 1 . . . 4 on/off | |
| Off-Field Wi-Fi on/off | |
| Off-field Bluetooth on/off | |
| Assisted GPS Location | GPS + Wi-Fi |
| Mic on/off | |
| Speakers on/off | |
| Helmet Temperature | |
| Battery Temperature | |
| Other relevant EXIF Data | |
| Eyes left/right | |
| Eyes up/down | |
| Eyes Dilated | |

| | VALUE |
|---|---|
| FOOTBALL VIDEO BLOCK | |
| Bitmap Frames Container | File location |
| Index for Frame Block | Index in File Memory Location |
| Number of Frames | |
| H.265 Container | |
| Start Index of Burst Block for H.265 container | |
| End Index of Burst Block for H.265 container | |
| FOOTBALL PANORAMIC FRAME META DATA (for Each Frame) | |
| Time Stamp | |
| Start of Down - centers hand on ball on ground | |
| Down Marker (from side markers or scoreboard) | 1 . . . 4 |
| Ball location in Frame | Start X/Y; End X/Y |
| Distance to Ball | |
| Shirt Number in Frame (repeat for all shirt numbers) | Start X/Y; End X/Y |
| Players Face in Frame (repeat for all faces) | Start X/Y; End X/Y |
| Distance to player (for each player w/shirt or face) | |
| Distance from home team side line | |
| Distance from away team side line | |
| Distance from End Zone | |
| Distance from 10 yard (repeat for each 10 yard marker) | |
| Distance from Left Hash mark | |
| Distance from Right Hash mark | |
| Acceleration - Left/Right | |
| Acceleration - Up/Down | |
| Acceleration - Push/Pull | |
| Gyro Tilt - x/y | Degree measurement |
| Gyro Tilt - x/z | Degree measurement |
| Gyro Tilt - y/z | Degree measurement |
| Tilt on Uprights | 1 . . . 180 |
| Game Clock Time from Scoreboard | |
| FOOTBALL AUDIO META DATA | |
| Speech to Text | |
| Huddle Command | |
| Huddle Call | Movement strategy enum, strength enum, formation enum, backfield set enum, motion enum, run/pass play, run/pass play enum, snap count, etc. This will identify the sequence of videos for 'Sport of Video' including timing of snap, quarter back timing, etc. |
| Line of Scrimmage Audible Call Array for no-huddle or check play | Directional, set go/fake/new (check) call, run/pass play, run/pass play enum, snap count This will identify the sequence of videos for 'Sport of Video' including timing of snap, quarter back timing, etc. |

| | VALUE |
|---|---|
| BASEBALL VIDEO BLOCK | |
| Bitmap Frames Container | File location |
| Index for Frame Block | Index in File Memory Location |
| Number of Frames | |
| H.265 Container | |
| Start Index of Burst Block for H.265 container | |
| End Index of Burst Block for H.265 container | |
| BASEBALL PANORAMIC FRAME META DATA (for Each Frame) | |
| Time Stamp | |
| At-Bat | RFID tag on Home Plate |
| Plate Tag | 1 . . . 3 . . . HP |
| Ball location in Frame | Start X/Y; End X/Y |
| Distance to Ball | |

-continued

| | VALUE |
|---|---|
| Shirt Number in Frame (repeat for all shirt numbers) | Start X/Y; End X/Y |
| Players Face in Frame (repeat for all faces) | Start X/Y; End X/Y |
| Distance to player (for each player w/shirt or face) | |
| Distance from home plate | |
| Distance from base 1 (repeat for bases 1, 2, 3) | |
| Distance from Pitcher plate | |
| Acceleration - Left/Right | |
| Acceleration - Up/Down | |
| Acceleration - Push/Pull | |
| Gyro Tilt - x/y | Degree measurement |
| Gyro Tilt - x/z | Degree measurement |
| Gyro Tilt - y/z | Degree measurement |
| Temperature | |
| Innings - from scoreboard | | d. Sport of View™ Examples

It should be understood that in various embodiments, only a single feed may be employed in to provide a requested POV. As such, the stage of stitching a plurality of feeds may not be necessary. Rather, in some embodiments, a temporal stitching (rather than spatial stitching) may be employed. Temporal stitching may refer to a sequential stitching of various the feeds (raw or processed) so as to sequentially combine the feeds to produce a single feed of varying source over a period of time. By way of non-limiting example, the feed from a first capturing device may be streamed as it corresponds to T0 to T1, while a second feed from a second capturing device (further still, a capturing device from a different helmet) corresponding to T1 to T2 may then be subsequently streamed. The following examples are non-exhaustive and non-limiting illustrative examples of various Sport of View™ perspectives that may be provided through the POV platform.

i. Follow the Ball

Consistent with some embodiments of the present disclosure, each stitched 360 panoramic view may be cropped to enable the focus of the view to be centric to a point of interest. For example, in a POV in which the ball is the point of interest (e.g., follow the ball), the 360 panoramic view may be cropped to maximize the video for in-field play vs. sky, ground or stadium stand views.

Figure 5:
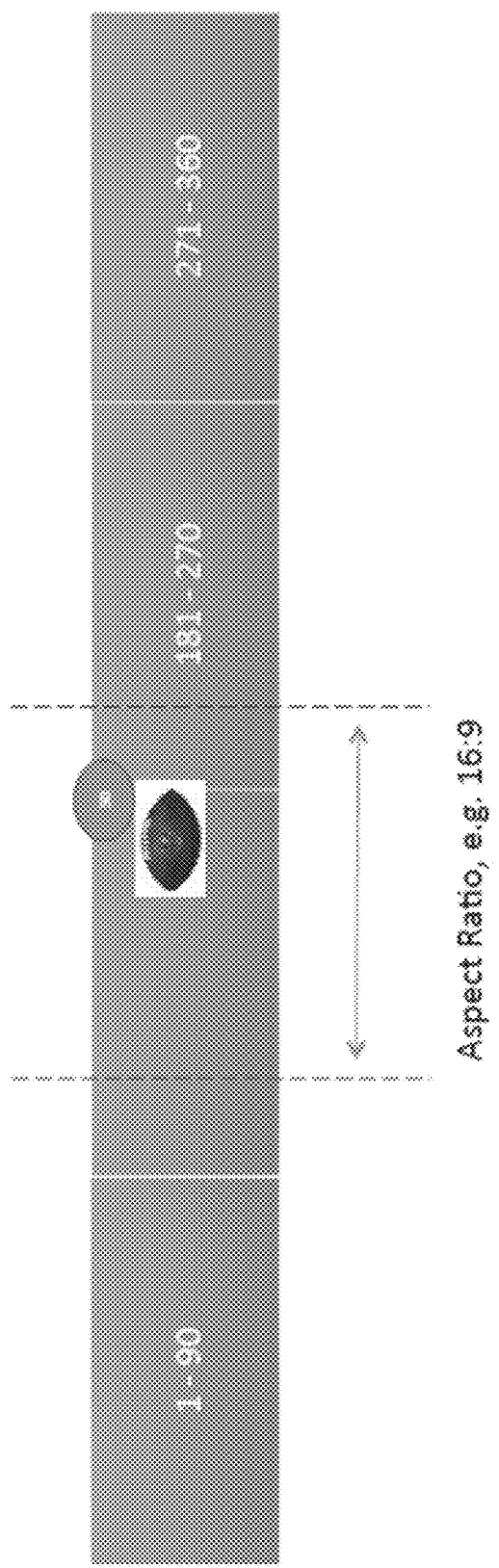
FIG. 5 illustrates an example of Metadata Scanning.

Referring now to FIG. 5, an illustration of a 360 panoramic views from a player's helmet is provided. The GPU may detect the ball, label 50, and then crop the 16:9 (or 1920×1080) frame accounting for line markings tilt, upright tilt, and turf compared to sky views, or stand views. If no ball is detected, the frame may be made blank (e.g., as a black or grey frame).

The corresponding Sport of View™ may then be transcoded in H.265/H.264 formats, stored and streamed out as a clip for applications such as tweeter. Suitable naming convention may be applied to each curated file (container), e.g., "Ball-Player 1", or "Ball-MAC Address 1", etc. These ball files (e.g., A/V container filers) may then be used in applications such as the one described below for Field Production.

The cropped bit map files may be kept in memory or discarded. They may be kept in memory if further scenarios have been requested, e.g., 'closest to the ball,' described infra.

ii. Closest to the Ball

Still consistent with embodiments of the present disclosure, temporal stitching may be employed to provide additional POVs. With temporal stitching, a number of various request views may be provided. For example, in the Closet to the Ball view, from the snap, the first view may be of the quarter back (QB) from offensive line men, followed by the running back in case of a run, or offensive half back providing pass protection. The view may then transition very quickly from the QB view to a receiver view. Once the Receiver catches the ball, the view may then transition to the defensive safety or defensive corner as they come to intercept the ball or receiver. This video sequencing may provide, for example, valuable intercept footage. Accordingly, a plurality of feeds with a plurality of points of interest may be combined using temporal stitching (which may be further combined with spatial stitching) to provide a plurality of POVs.

The sequencing of video in this case may be with some 'black' frames such that the transitions appear smooth to a human eye. An algorithm may also be employed to determine if the ball is blurred, i.e., ball transitioned too fast within a frame. Such frames may be discarded from the analysis, e.g., two black frames surrounding a ball frame.

In a running situation, the 'closest to the ball' scenario may produce an identical or similar video to that of 'closest to the Running Back'. Using the metadata for the processed feeds, the closest to ball data is selected frame by frame from each player (e.g., helmet). The processing may stop when the ball is on the ground.

In various embodiments employing temporal stitching, the POV platform operator may determine when the stitching would stop and when the view would be returned to a default player's view (e.g., a player selected by the platform operator or end-user). Moreover, for temporal stitching, the POV platform operator or user may also select which players view to stream at which point in time, thereby creating a customized Sport of View™.

The corresponding Sport of View™ video may then be transcoded in H.265/H.264 formats, stored and streamed out. A suitable naming convention will be applied to each curated file (container), e.g., "Long pass-Receiver X", or "Long pass-MAC Address X", etc.

iii. Follow the Player

Embodiments of the present disclosure may provide a Sport of View through which a player may be followed. For example, each the panoramic view may be cropped to so as to create a player-centric view while maximizing the video for in-field play vs. sky, ground or stadium stand views.

Figure 6:
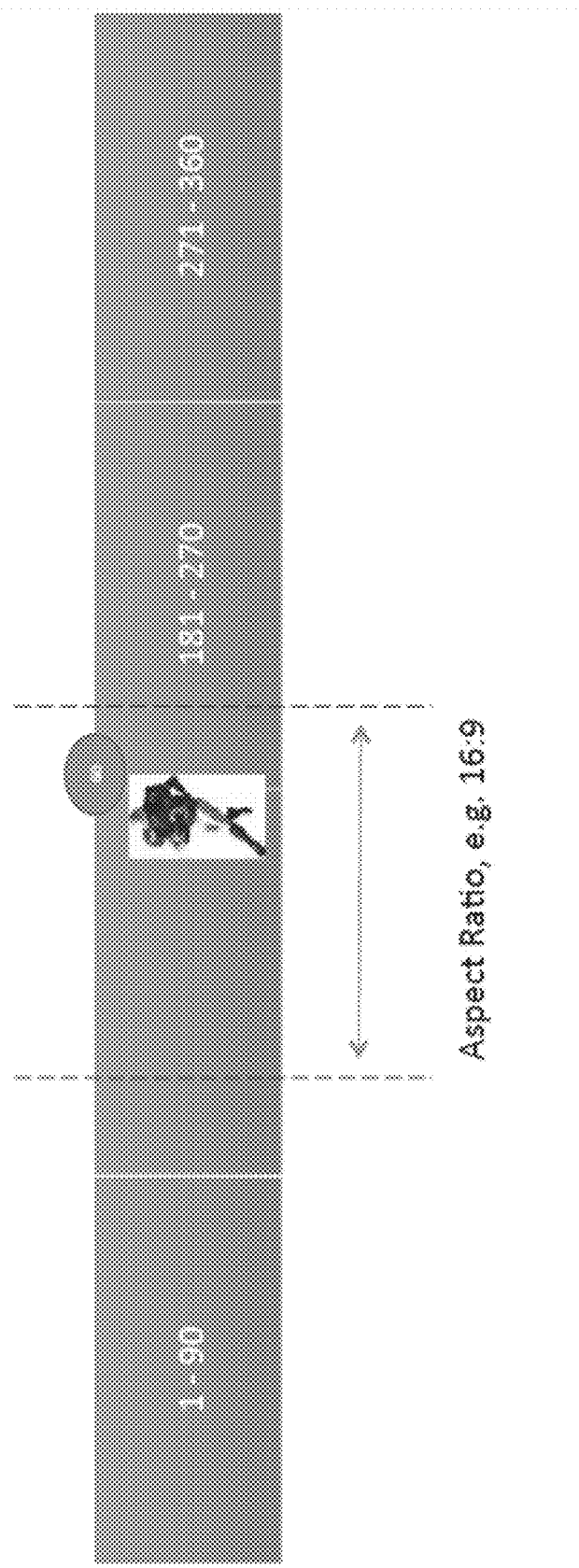
FIG. 6 illustrates another example of Metadata Scanning.

FIG. 6 illustrates an embodiments of the 360 panoramic views from a player's helmet. The GPU may detect a player by shirt number or face, label 60, and then crops the frame accounting for line markings tilt, upright tilt, and turf compared to sky views, or stand views. If the player is not found, the frame may be made blank (e.g., a black or grey frame).

The corresponding Sport of View™ video may then be transcoded in H.265/H.264 formats, stored and streamed out as a clip for applications such as tweeter. A suitable naming convention will be applied to each curated file (container), e.g., "RB-Player 1", or "RB-MAC Address 1", etc. The cropped bit map files may be kept in memory or discarded. They will be kept in memory if further scenarios have been requested, e.g., 'closest to the player,' described infra.

iv. Closest to the Running Back

Figure 7:
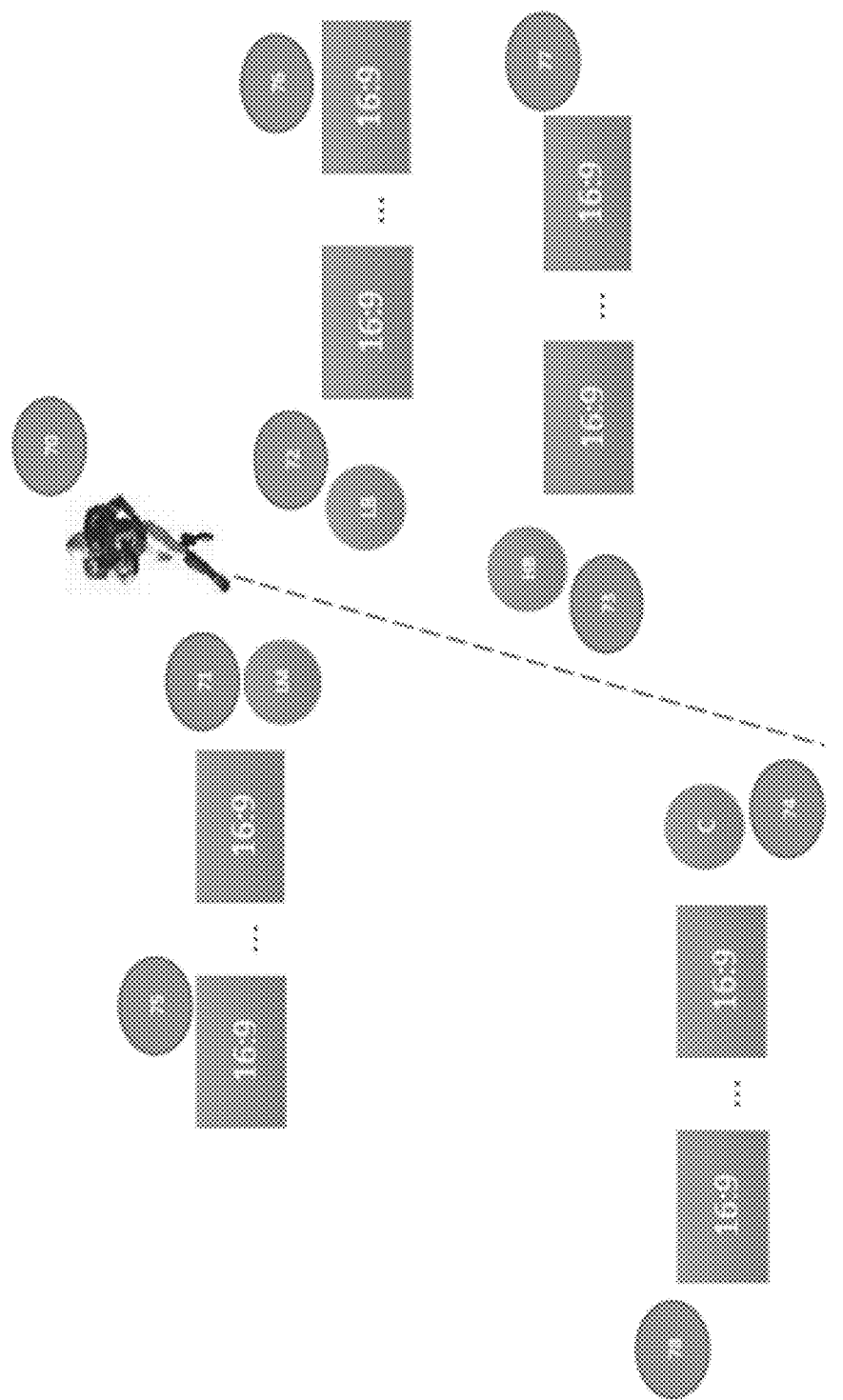
FIG. 7 illustrates an example of a "Sport of View" for a run.

Embodiments of the present disclosure may provide a Sport of View through which a running back may be followed. For example, from the snap, the first view of the RB may be from the QB, followed by the offensive line men, followed by defensive line men, followed by defensive half backs, followed by defensive corners or safeties. FIG. 7 illustrates an embodiment of this scenario, wherein the offensive Line Men, label 71, first sees the RB in this scenario, label 70. This may be followed by LB, label 72, followed by HB, label 73, followed by Corner, label 74. In this scenario, each player's helmet is configured to capture a series of frames, labels 75, 76, 77 and 78. These frames are all sequenced with black transition frames in between to make it palatable for the human eye.

In other embodiments, similar scenarios may provide perspectives of the left side of the RB and the right side of the RB. Further still, there may be videos of players even when there is no ball near the player, e.g., a receiver may run all the way down the field and may be closely guarded by a safety or corner. Such footage may be ideal to view perfect plays and speed of players, and create valuable footage of a running play. Accordingly, the closest to RB data may by selected frame by frame from each player within the metadata, and stitched temporally.

The corresponding Sport of View™ video may then be transcoded in H.265/H.264 formats, stored and streamed out. A suitable naming convention will be applied to each curated file (container), e.g., "Run play-RB", or "Run play-MAC Address RB", etc.

v. Plays from Playbook

Embodiments of the present disclosure may provide a Sport of View through which plays may be followed. For example, from the snap, based on the huddle and line of scrimmage calls, ball or player processed video streams may be selected and sequenced to show the sequence of the called play. There may be multiple viewing scenarios of this play. Such scenarios of each play could be from a QB perspective, from a receiver's perspective, or even from the defensive team perspective. These scenarios would be pre-programed while working with teams, esp. for coaching practice. In some embodiments, a platform operator may input such sequences as rules for video processing.

Such scenarios create valuable footage of a running play, and can be used by both the offensive coaching staff and defensive coaching staff on how well the team executes the playbook. The corresponding Sport of View™ video may then be transcoded in H.265/H.264 formats, stored and streamed out. A suitable naming convention will be applied to each curated file (container), e.g., "Play-Wide 33, Wide 33", "Play-4/3 Cover 2 Man", etc.

V. Applications

Multi-cast streaming is discussed in '915, the disclosure of which is incorporated herein by reference. This streaming may be achieved via, for example, a GStreamer or similar video streaming programs. The GStreamer may be able to handle RTSP requests for play, rewind, fast-forward, etc. to manipulate the stream. When a stream is re-wound, the unique trick stream is split from the multi-cast stream and is then unicast to the end application.

In local in-stadium applications, HTML5 may be used to display and manage the stream capabilities of GStreamer. Such examples would include fan entertainment on iPAD or similar devices, the field production application described below, etc. Outside of the stadium the multi-cast streams may be forwarded via CDN to B2B and B2C third parties, as described in '915.

The following is a non-exhaustive, non-limiting list of applications in which the POV platform may be employed.

a. Field Production

Figure 8:
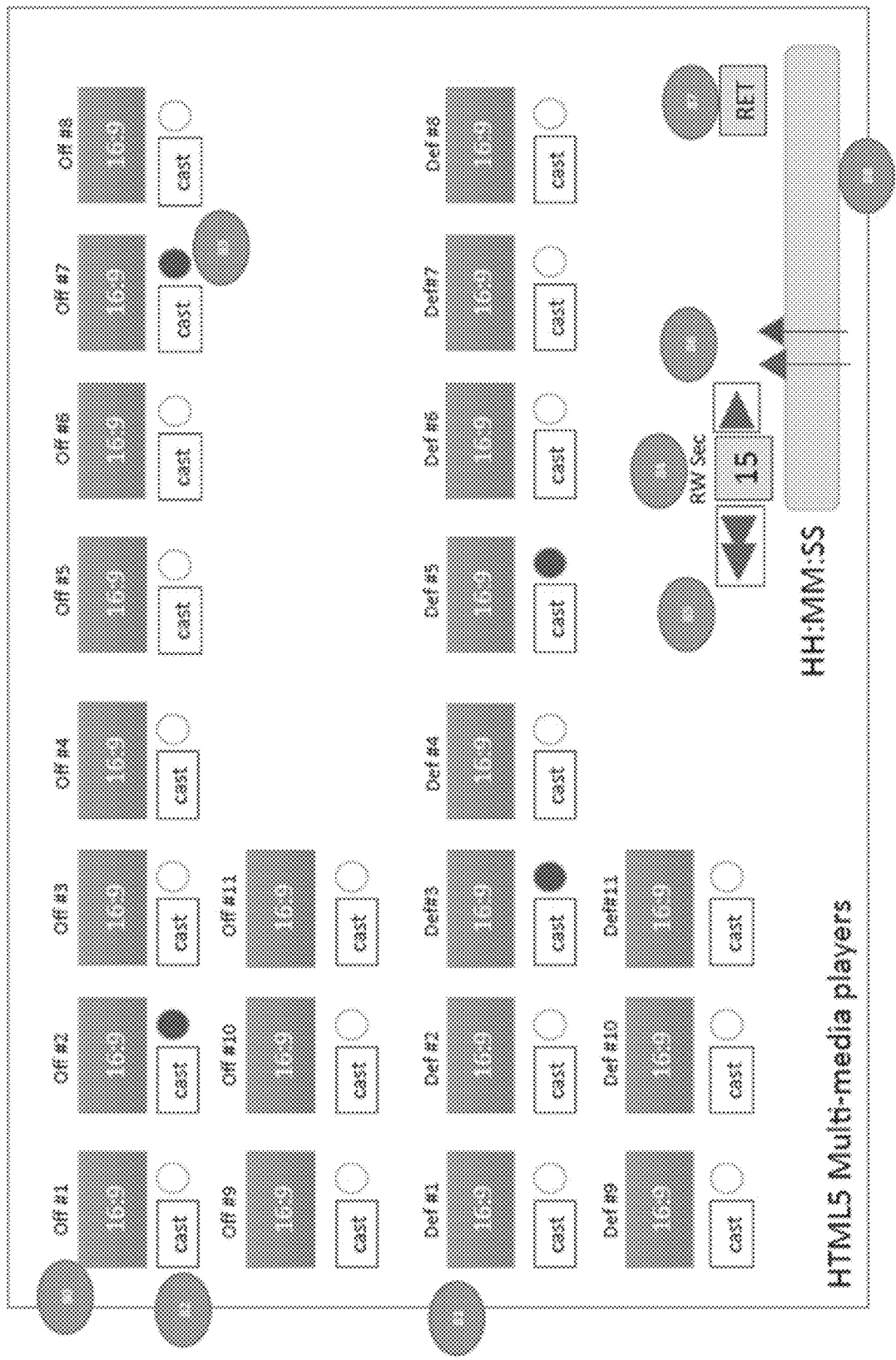
FIG. 8 illustrates an in-stadium production embodiment.

Consistent with the various embodiments herein, a field production application may be provided. The field production may require views of the ball for purposes of close shot broadcast, replays, jumbotron views, etc. Embodiments should enable a field operator to easily and quickly select and unicast forward streams. FIG. 8 illustrates an embodiment of a field production application in an HTML5 display.

In the display there are 11 offense media player video displays with aspect ratio of 16:9 represented by label 80; and 11 defense media player video displays with aspect ratio of 16:9 represented by label 81. As players come and go from the field, the display may automatically pick up the new players from the metadata, as well as show which team has the offense and defense positions, and the like.

When a ball is within the player's field of view, the media players may show the cropped view from the original panoramic stitched view, as explained in the non-limiting example of 'follow the ball,' supra. If the ball is not viewable by a player, the media player may display a black or grey screen.

At any time, the field operator (i.e., POV platform operator) may cast a player's video by selecting, for example, the 'cast' function, represented by label 82. The stream may be multi-cast or unicast depending on if it is the real-time main stream or a stream that has been re-wound, respectively. When a stream is being cast, the display may show, for example, a red status, represented by label 83.

In the case of a replay, the field operator may provision a second timer, label 84, and then select the re-wind function, label 85, to rewind all the media players by the selected number of seconds. The field operator may then play from the new position within the stream by selecting, for example, the play function, label 86. The re-wound position in the media stream is shown in the display as the green arrow marker, label 88. The real-time feed is shown by the red arrow marker. If feeds are selected during the re-wind process for casting, then the replay from these streams may be sent, or cast, to the production staff.

The field operator may return the panel to normal real-time operation by pressing, for selecting, the RET function, label 87. Streams may be disabled from forwarding by selecting, for example, the 'cast' function again. When the stream is deselected from forwarding, the status will be back to normal, i.e., not red.

b. Game Day Coach

Figure 9:
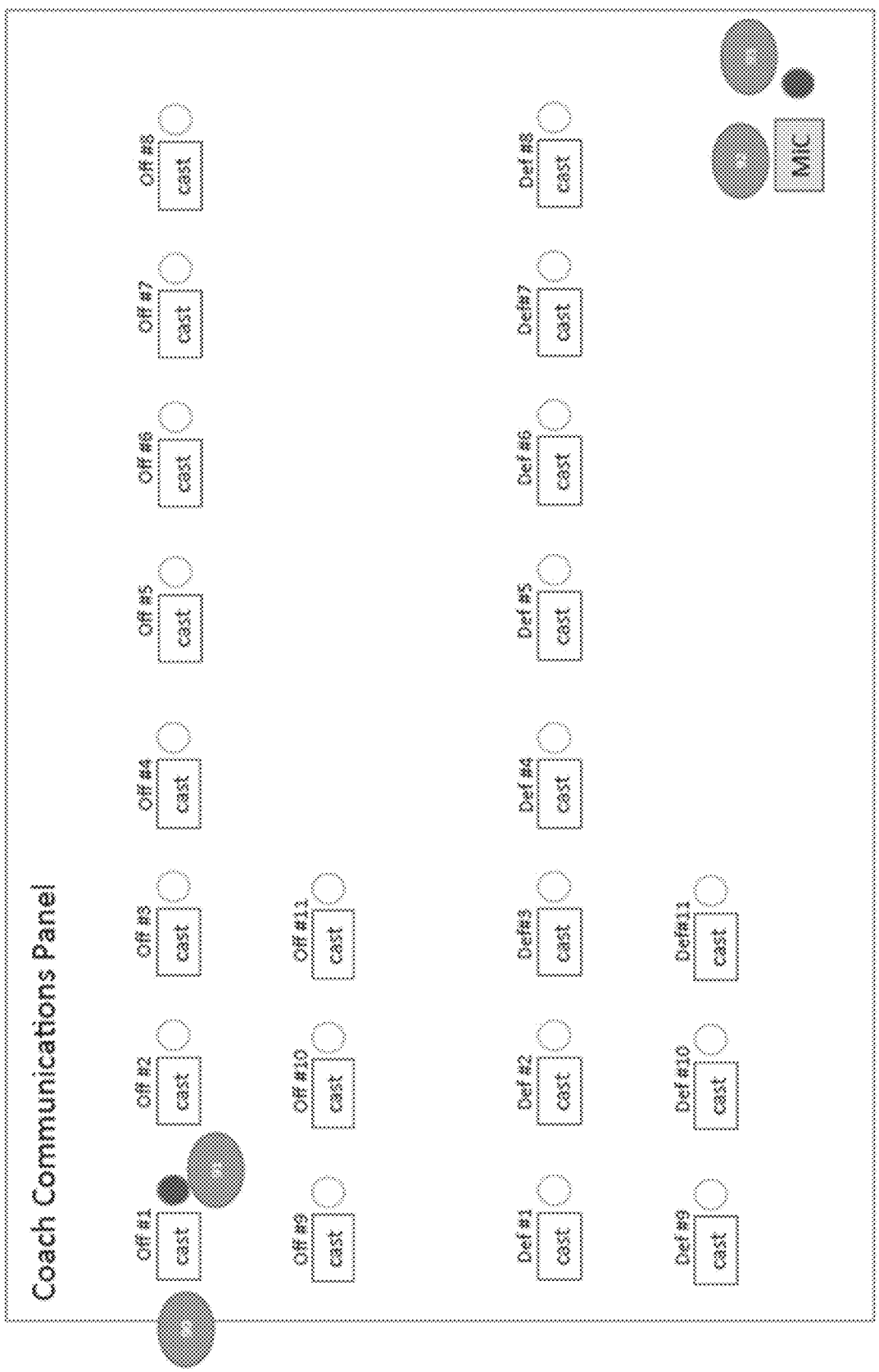
FIG. 9 illustrates a Coach Communications Panel.

Consistent with the various embodiments herein, a game day coach production application may be provided. In another example, coaches may be provided with a panel to manage on-field communications with players. FIG. 9 illustrates an example of an HTML5 display which may be provided to the coaches, both offense and defense coaches of each team (although variations to each embodiments may exist).

Each player on offense and defense may be represented on the display. As players come and go from the field, the display may automatically pick up the new players from the metadata applied to each players corresponding feed.

As a player leaves the field, the RFID tag information may be sent over the transport stream for processing and update to the metadata. This update may trigger the business rules engine to look at the player position and then look for a corresponding player coming back on the field. This player may be identified because the RFID tag information will be turned off which will also initiate the business rules to identify the position of the player on the field. When these positions match, the business rules engine may allow the coaching application to replace the shirt number and name of the player on the display.

Embodiments of the present disclosure, and in accordance to the disclosure of '613, the POV platform may enable the coaches to speak to the player or individual players such as the QB or Center Line Backer on defense. For example, a coach may select mic function, label 92, to speak with a player via the player's helmet. The mic status is shown on the display as on or off, label 93. Accordingly, in such embodiments, the coaches may be provided with a microphone and speaker that is integrated with the POV platform. In this way, two-way communication between the player and coach may be provided.

When individual players need to speak to the team, the coach can select the player's cast function, label 90. This will turn on the mic of the player. In some embodiments, all team members wearing an integrated helmet may be able to hear the player, such as the QB, as well as the coaches. The player's mic status is shown on the display as on/off, label 91.

c. Playbook

Figure 10:
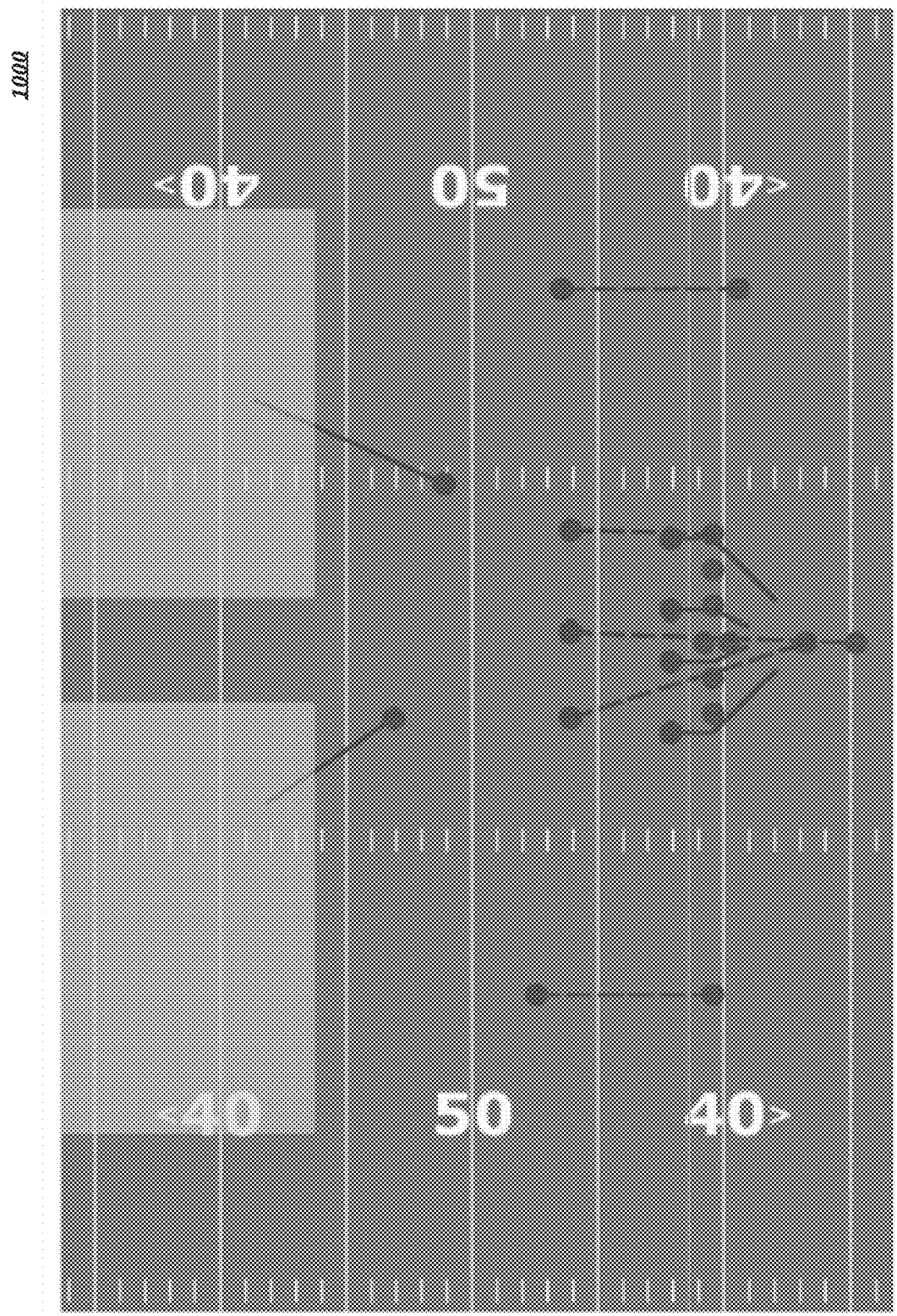
FIG. 10 illustrates a Play Book display.

Consistent with the various embodiments herein, a playbook application may be provided. FIG. 10 is an example of a playbook display 1000. Using the metadata stored on each frame on each player, an HTML5 display may be created during the game or after the game showing actual movement of player's frame-by-frame. In some embodiments, the red dots represent the offense, while the blue dots represent the defense.

d. Panoramic View

In some embodiments, panoramic views may be streamed out within the stadium or to a CDN for viewing using an application able to render the panoramic views on a mobile device such as an iPAD, Android Pad, iPhone, Android phone, and various other computing devices. The application may be able to select from multiple feeds for viewing.

e. Medical Application

As referenced above with respect to FIG. 4, metadata from the face camera is collected. This metadata can show concussion problems, such as dilated eyes. Along with this, the wearable helmet gear may also provide temperature readings, acceleration readings and gyro readings. Such collected data may be useful for medical application.

f. Battery Monitoring Application

With reference to '613, a Temperature sensor may be placed in the battery pack area. When temperature exceeds a specified temperature, the battery monitoring application will issue an alert and then shut down the wearable system.

g. Automated Digital Signage

Still consistent with embodiments of the present disclosure, metadata may be made available to applications via, for example API's associated with the platform, to add digital signage in applications. By way of non-limiting example, in coaching applications—the game clock may be shown, or number of the down may be shown, etc. In some embodiments, this application may be used for marketing and advertising opportunities presented to, for example, third parties. Further still, audio may also be provided in some applications from the metadata, e.g., using the text recorded from the game.

VI. Platform Operation

Figure 11:
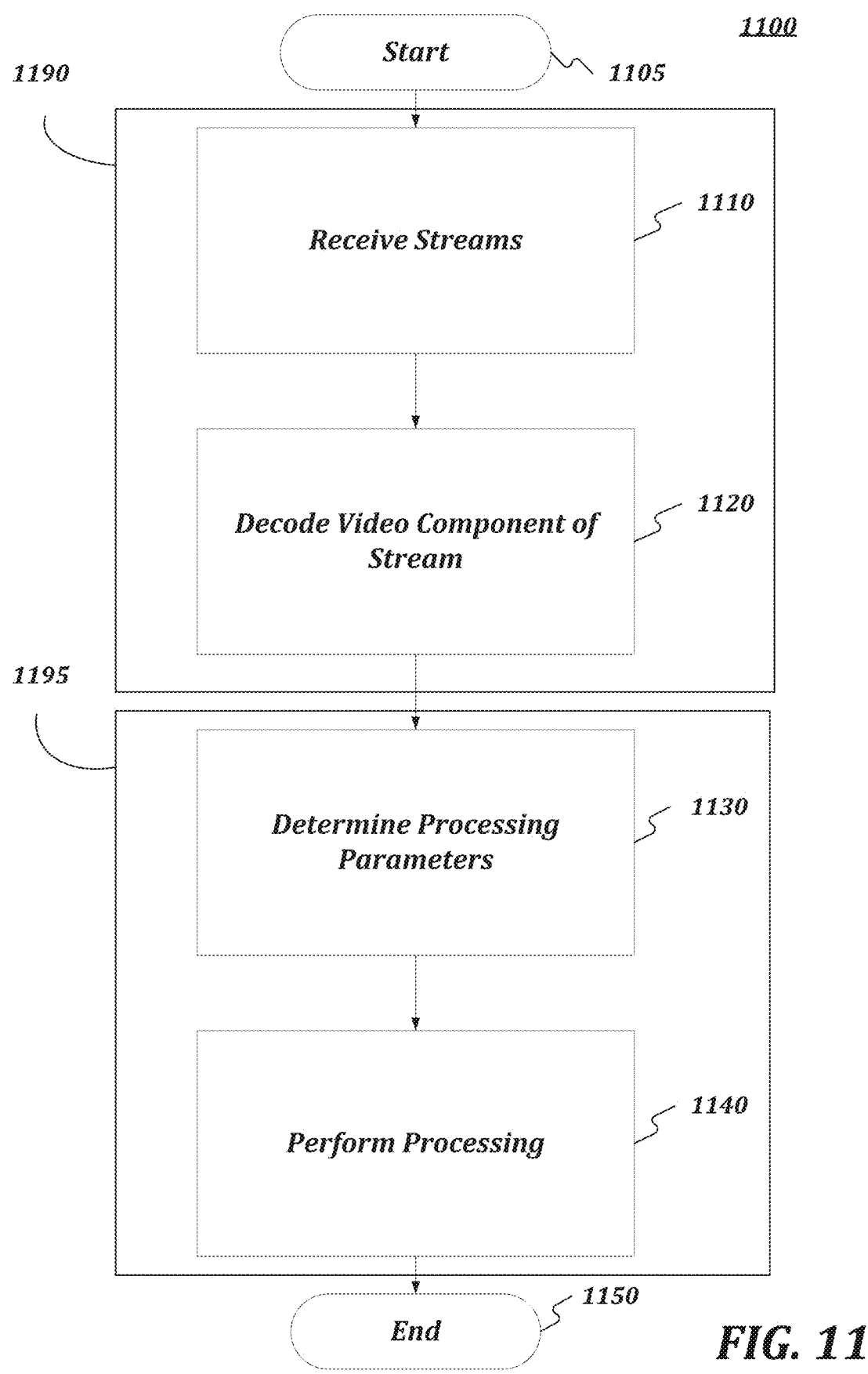
FIG. 11 illustrates a flow chart for performing a platform method.

FIG. 11 is a flow chart setting forth the general stages involved in a method 1100 consistent with an embodiment of the disclosure for providing the platform of the present disclosure. Method 1100 may be implemented using Video Processing server 3 or computing device 1200 as described in more detail below with respect to FIG. 12 (collective referred to as the "platform").

Although method 1100 has been described to be performed by video processing server 3 as illustrated in FIG. 1B or a computing device 1200 as detailed below with respect to FIG. 12, it should be understood that, in some embodiments, different operations may be performed by different networked elements in operative communication with video processing server 3 and/or computing device 1200.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 1100 will be described in greater detail below.

Method 1100 may begin at starting block 1105 and proceed to stage 1110 where the platform may receive plurality of transport streams. Each transport stream may comprise, for example, but not be limited to audio, video, telemetry and location data. Such data may be received from a capturing device such as, by way of non-limiting example, a helmet consistent with the '613 application. In various embodiments, each component of the transport stream may be received in its own transmission stream. Consistent with embodiments of the invention, and as further detailed in the '915 application, the transport stream may be received in an ingest layer of the platform.

Moreover, each transport stream of the plurality of received transport streams may be associated and tagged with the corresponding helmet that captured the data communicated via the transmission stream.

From stage 1110, where the platform receives the transport stream, method 1100 may advance to stage 1120 where the platform may decode the transport stream. Decoding may be associated with the video component of the transport stream. Each frame of the video component may be decoded into a pixel map. In some embodiments, prior to substantive processing to provide a Sport of View™ the video frames associated with various capturing devices of each helmet to stitch a spatial panoramic view. The panoramic view may remain in the decoded pixel map format for further processing.

Still in further embodiments, a plurality of pre-Sport of View™ processing algorithms may be employed on the frames, including, but not limited to, stabilization, color & Polarization, light and shadow distribution, and a plurality of others mentioned above.

Once platform has decoded the video component of the transmission stream in stage 1120, method 1100 may continue to stage 1130 where the platform may determine parameters for processing (e.g., stitching) the plurality of transport streams to provide a view (e.g., Sport of View™). Non-video components of the transport stream may also be employed in the creation of the Sport of View™. For example, a rules-engine may determine a plurality of parameters for analyzing the decoded video content as well as the telemetry/location data associated with the video content (e.g., metadata corresponding to the video content). The parameters may be received from, but not limited to, a platform end-user (e.g., viewer) or a platform operator (e.g., admin or coach). In various embodiments, the parameters may be received via, for example, an application programming interface (API).

In some embodiments, the parameters may be derived from user selections. For example, the platform may provide a listing of views (e.g., Sport of Views) to a user. Based on the user's selection, corresponding video processing parameters may be determined. The rules engine, in turn, may determine which rules to apply in processing the received transport stream to provide the selected views.

After determining the processing parameters in stage 1130, method 1100 may proceed to stage 1140 where the platform may process the plurality of transport streams. Processing may comprise a frame-by-frame assessment based on the rules established by the rules engine (in conjunction with the determined processing parameters). For example, based on the various Sport of View™ selected by the user, video processing may comprise a scanning of each pixel map (e.g., frame) to locate various objects (e.g., players, ball, field objects, etc.). Based on the findings of the scan, the platform may stitch together the various content feeds received from the plurality of transport streams to provide a single stitched content stream. Details of various stitching parameters based on view selections are provided above.

Moreover, in addition to scanning each pixel map, non-video data may be used in processing to establish the stitched frame (e.g., metadata, telemetry data and location data may be employed in the processing). For example, a user selected view may be associated with following a particular player. The player may be identified in the transport stream not by the video component of the stream, but by the associated metadata. In this way, the platform may employ both image processing and metadata in stitching a final view from a plurality of transport streams.

Once platform competes the processing in stage 1140, method 1100 may then end at stage 1150.

Various embodiments of method 1100 may comprise stages 1190 and 1195. Method 1100 may begin at starting block 1105 and proceed to stage 1190, where platform 100 may receive a plurality of streams comprising at least one video stream and at least one telemetry data stream associated with the at least one video stream. Platform 100 may further create metadata corresponding to the at least one video stream and the at least one telemetry data stream. In some embodiments, creation of the metadata may comprise processing at least one frame of the at least one video stream to detect at least one artifact within the frame, processing the at least one telemetry data stream to determine telemetry data associated with the at least one frame of the at least one video stream, and annotating the at least one artifact and the telemetry data within a portion of the metadata associated with the at least one frame.

In further embodiments, platform 100 may further decode the at least one video stream prior to creating the metadata. Moreover, processing the at least one frame of the at least one video stream to determine the at least one artifact within the frame may comprise accessing a library of comprising a plurality of artifacts and determining if any elements in the at least one decoded frame correspond to any one of the plurality of artifacts in the library. In some embodiments, determining if any elements in the at least one frame correspond to any one of the plurality of artifacts may comprise analyzing the at least one decoded frame for at least one of the following: lighting, shading, physical objects, text, and the like. In further embodiments, processing the at least one telemetry data stream to determine the telemetry data associated with the at least one frame of the at least one video stream may comprise synchronizing the at least one decoded video stream with the at least one telemetry data stream. In various embodiments, synchronizing the at least one decoded video stream with the at least one telemetry data stream may comprise averaging the telemetry data across a plurality of frames.

From stage 1190, method 1100 may proceed to stage 1195, wherein platform 100 may provide the metadata along with the corresponding at least one video stream to at least one rules engine. In further embodiments, platform 100 may receive the metadata and the corresponding at least one video stream for a plurality of video streams and process the plurality of video streams to create a logical view. Moreover, platform 100 may determine a desired logic view to create and determine a set of rules for processing the plurality of video streams to create the logical view.

Processing the plurality of video streams to create the logical view may, in some embodiments, comprise at least one of the following: analyzing the metadata associated with each of the plurality of video streams, and stitching at least two portions of at least two video streams of the plurality of video streams based on the set of rules and the analyzed metadata. In some embodiments, stitching the at least two portions of the at least two video streams may comprise performing at least one of the following: temporal stitching, and spatial stitching. Platform 100 may further create logical view metadata for the logical view. Moreover, platform 100 may encode the logical view and transmit the logical view to at least one of the following: a content distribution network and a client device.

In various embodiments, platform 100 may receive the logical view and display the logical view. In some embodiments, displaying the logical view may comprise providing a plurality of logical views for selection, receiving a selection of the logical view, and displaying the selected logical view. In further embodiments, platform 100 may receive the logical view metadata, receive the logical view, and receive a specification in displaying the logical view. In such embodiments, the specification in displaying the logical view may comprise at least one of the following: a pan specification, a zoom specification, and a directional lock specification. In further embodiments, the specification in displaying the logical view may comprise at least one of the following: a pause request, a fast-forward request, a rewind request, and a slow-motion request. In yet further embodiments, platform 100 may determine a set of rules for providing the desired specification, process the logical view based on the logical view metadata and the set of rules, and display a specified logical view. In some embodiments, determining the logical view to create may comprise determining the logical view to create based on a received request for the logical view from a client device. Once platform completes stage 1195, method 1100 may then end at stage 1150.

In various embodiments, content streaming may also be provided as detailed in the '671 application.

VII. Platform Architecture

Various portions of the platform may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform may be hosted on a centralized server, such as, for example, a cloud computing service. Although method 1100 has been described to be performed by a computing device 1200, it should be understood that, in some embodiments, different operations may be performed by different networked elements in operative communication with computing device 1200.

Embodiments of the present disclosure may comprise a system having a memory storage and a processing unit. The processing unit coupled to the memory storage, wherein the processing unit is configured to perform the stages of method 1100.

Figure 12:
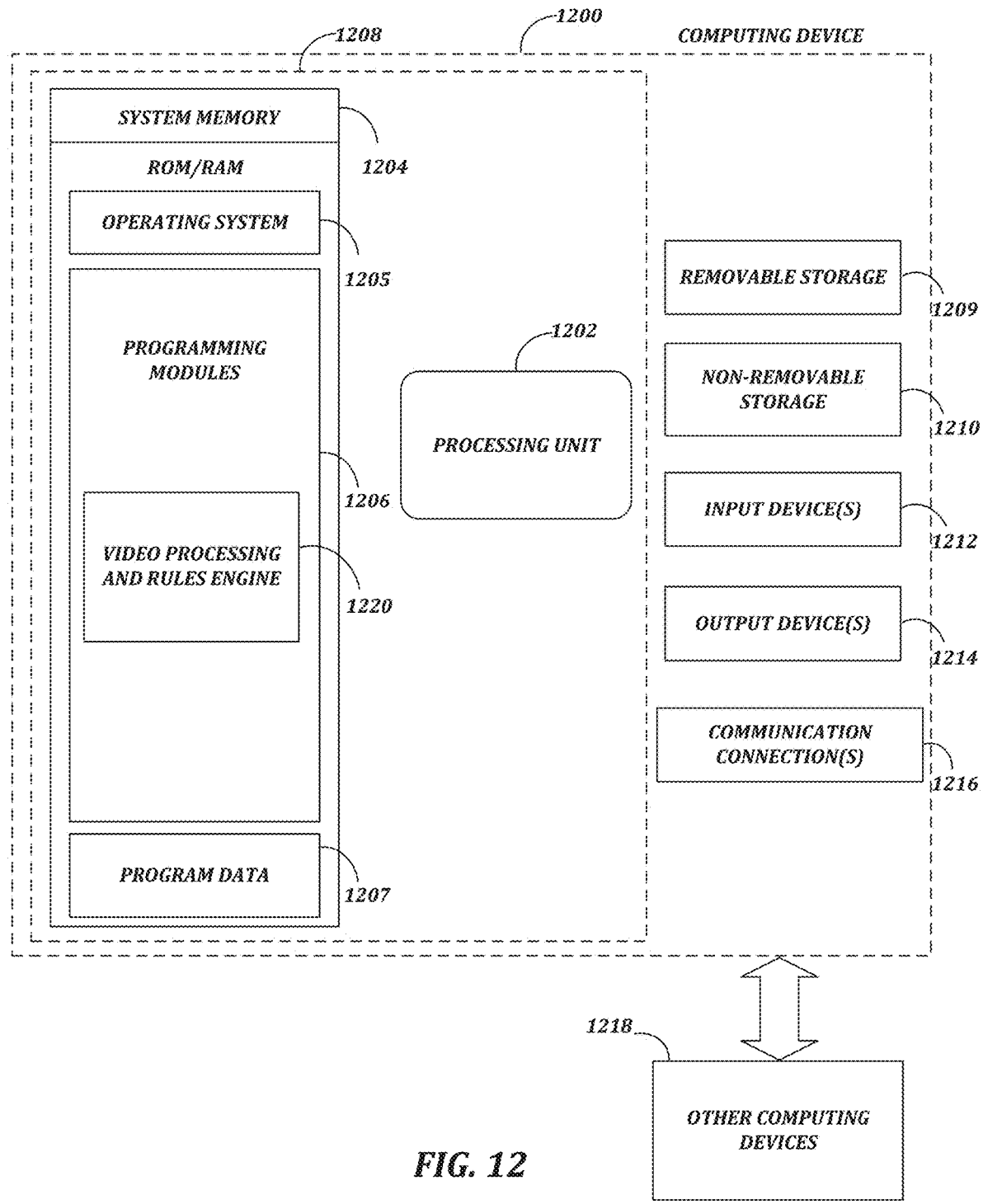
FIG. 12 illustrates a computing device for performing the platform method.

FIG. 12 is a block diagram of a system including computing device 1200. Consistent with an embodiment of the disclosure, the aforementioned memory storage and processing unit may be implemented in a computing device, such as computing device 1200 of FIG. 12. Any suitable combination of hardware, software, or firmware may be used to implement the memory storage and processing unit. For example, the memory storage and processing unit may be implemented with computing device 1200 or any of other computing devices 1218, in combination with computing device 1200. The aforementioned system, device, and processors are examples and other systems, devices, and processors may comprise the aforementioned memory storage and processing unit, consistent with embodiments of the disclosure.

With reference to FIG. 12, a system consistent with an embodiment of the disclosure may include a computing device, such as computing device 1200. In a basic configuration, computing device 1200 may include at least one processing unit 1202 and a system memory 1204. Depending on the configuration and type of computing device, system memory 1204 may comprise, but is not limited to, volatile (e.g., random access memory (RAM)), nonvolatile (e.g., read-only memory (ROM)), flash memory, or any combination. System memory 1204 may include operating system 1205, one or more programming modules 1206, and may include a program data 1207. Operating system 1205, for example, may be suitable for controlling computing device 1200's operation. In one embodiment, programming modules 1206 may include a video processing and rules engine application. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and nonvolatile, removable and non-removable media implemented in any method or technology for storage of information, such as computer readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., video processing and rules engine application 1220) may perform processes including, for example, one or more of method 1100's stages as described above. The aforementioned process is an example, and processing unit 1202 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

VIII. Aspects

The following disclose various Aspects of the present disclosure. The various Aspects are not to be construed as patent claims unless the language of the Aspect appears as a patent claim. The Aspects describe various non-limiting embodiments of the present disclosure.

Embodiments may provide methods and systems configured for:
  receiving a plurality of content streams;
    wherein the plurality content streams comprises a plurality of frames;
      wherein the plurality of frames correspond to data captured by a plurality of content capturing sources;
        wherein the plurality of content capturing sources are further configured to capture telemetry data;
        wherein the plurality of content capturing sources are further configured to capture audio data;
        wherein the plurality of content capturing sources comprise a wearable video and audio capturing means;
          wherein the wearable camera is worn by a participant in a sporting event;
        wherein the plurality of content capturing sources comprises an event video and audio capturing means;
          wherein the event camera is capturing the sporting event
  retrieving metadata associated with each of the plurality of content streams;
    wherein the metadata comprises annotations associated with at least one of a plurality of frames within each content stream;
      wherein the annotations comprise at least one target annotation indicating an existence of an artefact in a corresponding frame;
        wherein the at least one target annotation is specified based on at least one processing rule;
        wherein the artefact is specified based on the at least one processing rule;
          wherein the at least one processing rule is based on a desired output stream;
  processing the metadata to detect the at least one target annotation;
    wherein the processing to detect the at least one target annotation is performed across the plurality of content streams;
      wherein detecting the at least one target annotation in more than one of the plurality of content streams indicates the presence of the artefact in at least one frame of each of the corresponding target content streams;
    wherein the processing to detect the at least one target annotation is performed in a context of at least one processing rule;
      wherein the at least one processing rule is based on a desired output stream;
    wherein the processing to detect the at least one target annotation comprises the processing of telemetry data;

wherein the telemetry data comprises at least one of the following: vector data, motion data, and location data;
  wherein processing the telemetry data further comprises processing the metadata of additional content sources;
wherein the processing is performed:
  on a per rule basis;
  in a parallel basis for a plurality of rules;
    wherein the plurality of rules are associated with a plurality of output streams;
determining content sources associated with each target content stream;
  wherein at least one content source is associated with at least one player in a sporting event;
    wherein the at least one content source is associated with a wearable camera worn by the at least one player in the sporting event;
  further comprising:
    determining at least one proximate content source in spatial proximity to each content source associated with each target content stream;
  wherein processing the telemetry data further comprises determining at least one proximate content source in spatial proximity to each content source associated with each target content stream;
  wherein processing the telemetry data further comprises determining, based on telemetry vector data, a subsequent content source in relation to a projected appearance of the artefact in a frame associated with the subsequent content source;
  wherein processing the telemetry data further comprises determining at least one proximate content source in spatial proximity to each subsequent content source;
retrieving telemetry data associated with the corresponding target content stream provided by each content source;
  wherein the telemetry data is retrieved from the metadata;
    wherein the telemetry data is retrieved from the metadata associated with each frame comprising the at least one target annotation in the metadata;
  wherein the telemetry data is associated with each frame comprising the at least one target annotation in the metadata;
  further comprising:
    retrieving telemetry data associated with a corresponding target content stream provided by each proximate content source;
processing the telemetry data and the metadata associated with a plurality of frames in each target content stream to ascertain vector motion data;
  wherein the vector motion data provides data related to the relevant motion of each content sources corresponding to each target content stream;
    wherein the vector motion data provides data related to the relevant motion of at least one proximate content source in special proximity to each content sources corresponding to each target content stream;
  wherein the processing is performed for the frames in which the artefact was indicated;
    wherein the processing is further performed for the surrounding frames in addition to the frames in which the artefact was indicated;
    wherein the processing is performed for one or more frames in a proximate content stream captured by the at least one proximate content source
  wherein the processing is performed:
    on a per rule basis;
    in a parallel basis for a plurality of rules;
      wherein the plurality of rules are associated with a plurality of output streams;
mapping a spatial relationship between the target content sources;
  wherein the mapping is based on, at least in part, the vector motion data;
  wherein the spatial relationship is configured to enable an indication, for each content source, at least one of the following:
    a past position, a present vector, a future position
  wherein the vector motion data comprises predictive motion data;
    wherein the predictive motion data indicates a propagation vector and velocity that a content source is predicted to propagate;
  wherein the spatial relationship indicates the spatial relationship between the artefact, the target content sources, and the at least one proximate content source;
  wherein the spatial relationship indicates the spatial relationship between the artefact, the target content sources, and the at least one proximate content source;
  wherein the mapping is performed:
    on a per rule basis;
    in a parallel basis for a plurality of rules;
      wherein the plurality of rules are associated with a plurality of output streams;
Embodiments may further comprise methods and systems configured for:
  processing image data within the plurality of frames to ascertain vector motion data for the artefact;
    wherein the artefact comprises a competitive element within a sporting event;
  determining at least one projected content source in proximity to a trajectory of the artefact;
    wherein the trajectory is based on, at least in part, the vector motion data;
  ascertaining vector motion data of the projected content source, and
    mapping the spatial relationship between the target content sources and the projected content source;
    mapping the spatial relationship between the target content sources, the at least one projected content source, and the at least one proximate content source;
    mapping the spatial relationship between the artefact, the target content sources, the at least one projected content source, and the at least one proximate content source.

Aspect 1. Methods and systems capable to perform:
  searching annotated video frames for specified metadata (e.g., artefacts by description and graphics);
  comparing them against player cameras; (e.g., find the same artefacts in [some or all] multiple streams); and
  linking with telemetry/vector motion from one player camera to another player camera. (e.g., understand the spatial motion of each camera and all elements/objects with the frame recorded by each camera).

This aspect discloses some preliminary elements that are employed to enable the curation of "sport of views" as disclosed by this patent disclosure and patent disclosure family. For example, curation of the Sport of Views may enable the platform to curate a baseball stream. Here, each baseball players' perspective on the pitcher; stitch those to provide a 360 degree view. The platform may be configured to stitch in both time and space because when we curate content from one camera to the next (e.g., one wearable to the next), we will need to know what the spatial motion vectors are.

Accordingly, the artefact we will look for within each frame may be determined based, at least in part, on the processing rule we are using to generate a view. In some embodiments, all of these rules associated with all of the views may have been processed and metadata tagged prior to the generation of the sport of view. In some embodiments, this process can be performed "live." Thus, prior to searching for annotated video frame, the platform may first be configured to determine which views will require which artifacts based on, for example, rules associated with the views.

Aspect 2. The methods and systems of Aspect 1, further comprising:

applying a rule, e.g., "Quarter back play from a receiver's point of view," to stitch sequential frames in time sequence.

Consistent with embodiments of the present disclosure, the platform may utilize a first one player's feed to view another player's actions. Furthermore, multiple players' feed of the same other player's actions.

Another rule, such as, "Show me all players currently looking at quarterback"

Those feeds may then be:
Stitched in Space (e.g., hemispherical or spherical view constructed from multiple camera feeds), and/or
Stitched in Sequence (e.g., time based sequencing from multiple camera feeds)
"As one player's view is blocked, the platform can switch to another players view".

Aspect 3. The methods and systems of Aspect 1, further comprising:

applying a second rule, e.g., "Quarterback play from Defensive Line" using Quarterback motion (e.g., vector telemetry) to stitch in time sequence of frames from multiple defensive line player cameras providing the optimum view of the Quarterback.

Vector telemetry may be used to determine whether the quarterback is running form left-to-right.
Distances between each player can be calculated as the quarter back moves.
The platform may pick the nearest player for camera selection.
The platform may use Location Data.
The platform may use Depth Data (Cameras can have depth sensors).
Calculation of Time of Flight may be performed.
Furthermore, the platform may be further configured to track the "Target Player" by external specification:
Face match
Number match
A Position/Location Match
In various embodiments, the above elements are pre-processed and tagged in corresponding metadata. Accordingly, metadata may comprise the following data:
Depth
Telemetry
Vector Data.

Aspect 4. The methods and systems of Aspect 1, wherein the rule by which an artefact is identified specifies what imaging processing is needed.

Aspect 5. The methods and systems of Aspect 4, wherein the platform may be configured to apply commercially available techniques (e.g., graphics processing technologies) to provide quality stitched video; such as calibration for lens distortion as well as the rotation and translation between each camera, Stereoscopic stitching by aligning videos and blending in the areas of overlap accounting for calibration, parallax in the source videos, and temporal consistency.

Aspect 6. The methods and systems of Aspect 1, further comprising:

Applying a rule, "Quarterback 180 view," to stich in space sequence frames from multiple Quarterback cameras providing the optimal view of the defensive field.

In certain embodiments of the present disclosure, the platform seeks out the metadata associated with Device ID, to be able to identify the appropriate devices.

Aspect 7. The methods and systems of Aspect 6, further comprising:

Applying a subsequent rule, "Focus on Receiver in Quarterback 180 view," to collect telemetry location information on position of receiver in the 180 view for all time sequenced frames. This telemetry information is delivered to an end device/user terminal along with the video frames.

In this instance, the platform is combing the 6th aspect with the artefacts detected in the frame.
Used for prediction of whether QB is going to throw to Receiver A or Receiver B.
The platform can also detect the eye motion of the QB (as provided in commonly owned U.S. patent application Ser. No. 14/801,613).
The platform can switch to the receiver predicted to receive the ball based, at least in part, on the eye motion.
Can instruct GPU to start constructing subsequent view from receiver's content sources, or those who within a projected path, near the receiver, or have the receiver within view.
In some embodiments, the data aggregated and processed from the plurality of sources, can be used to provide instructions (e.g., audio queues) to instruct QB where to throw the ball.

Aspect 8. The methods and systems of Aspect 7, wherein:

the application running on an end device/user terminal may be configured keep the focus on the receiver in the Quarterback 180 view, wherein the focus comprises centering the receiver in the video display, wherein the focus is further provided with zoom-in and zoom-out functionality, the usage of which simulates an AI-based camera operator.

Furthermore, the video application can provide the position of the receiver on an application display, wherein the application display may comprise a CGI display.

The platform may further be configured to highlight/focus on available receiver.
The platform may enable:
A coach can analyze play and see where available players were;
A broadcaster can do the same; and
A display of this data visually with CGI/Augmentation to the Stitched Sport of View.

Embodiments of the present disclosure may further enable:
  A prediction of a desired sport of view per playback based on detected patterns (e.g., the platform may determine that an end-user prefers to see Running Plays, from the perspective of QB).
  A prediction of a team's subsequent plays.
  A recommendation for a team's subsequent plays.
Aspect 9. The methods and systems of Aspect 8, wherein:
  The application running on an end device/user terminal pan the display left to right; if the end device/user terminal is rotated left or right by the user.
Aspect 10. The methods and systems of Aspect 1, further comprising:
  Applying an additional rule for preferences/recommendations, e.g., Show all views of Safety, to time sequence of frames from multiple player cameras providing multiple clips of the Safety from various angles.
Aspect 11. The methods and systems of Aspect 10, wherein:
  the clips can be made available to an end device/user terminal to select for playout. These clips will be refreshed on the end device/user terminal as they are made available in time sequence.
  Embodiments of the present disclosure for enable:
  An end user to choose which view to stream.
  An end user to switch views.
  In this way, an end user can be their own director of a custom Sport of View.
    Enable Users to Create and Save their own Sport of Views.
Aspect 12. Methods and systems configured to:
  Provide an administration console to enter meta data (artefacts by description and graphics) for cataloging video frames from multiple player cameras.
    This may be used for rule entry associated with the detected Artefacts.
    The following is claimed:

1. A method comprising:
  receiving a plurality of content streams;
  retrieving metadata associated with each of the plurality of content streams;
  receiving a selection of at least one desired view;
  generating parameters associated with processing the at least one desired view for the plurality of content streams and the metadata associated with each of the plurality of content streams;
  processing the metadata according to the parameters associated with the at least one desired view to detect at least one target annotation within at least one target content stream;
  generating a pixel map from the at least one target content stream;
  identifying a plurality of artefacts from the pixel map associated with the at least one desired view;
  retrieving telemetry data associated with the at least one target content stream;
  processing the telemetry data, the identified plurality of artefacts in the pixel map, and the metadata associated with a plurality of frames in the at least one target content stream to ascertain vector motion data; and
  mapping a spatial relationship associated with at least one capturing device associated with at least one target content source and the at least one desired view.

2. The method of claim 1, further comprising: processing image data within the plurality of frames to ascertain the vector motion data for an artefact associated with the at least one target annotation.

3. The method of claim 2, wherein the artefact comprises a competitive element within a sporting event.

4. The method of claim 2, further comprising: determining at least one projected content source in proximity to a trajectory of the artefact.

5. The method of claim 4, wherein the trajectory is based on, at least in part, the vector motion data.

6. The method of claim 4, further comprising: ascertaining additional vector motion data of the at least one projected content source.

7. The method of claim 6, further comprising at least one of the following:
  mapping the spatial relationship between the at least one target content source and the at least one projected content source; and
  mapping the spatial relationship between the at least one target content source, the at least one projected content source, and the artefact.

8. The method of claim 1, wherein receiving the plurality content streams comprises receiving the plurality of frames, the plurality of frames corresponding to data captured by a plurality of content capturing sources.

9. The method of claim 8, wherein the plurality of content capturing sources are further configured to capture at least one of the following: telemetry data, audio data, video data.

10. The method of claim 8, wherein the plurality of content capturing sources are worn by participants in a sporting event.

11. The method of claim 1, wherein retrieving the metadata comprises retrieving the at least one target annotation associated with at least one of the plurality of frames within each content stream.

12. The method of claim 11, wherein the at least one target annotation comprise the at least one target annotation indicating an existence of an artefact in a corresponding frame.

13. The method of claim 12, wherein the at least one target annotation is specified based on at least one processing rule.

14. The method of claim 13, wherein the at least one processing rule is based on a desired output stream.

15. The method of claim 1, wherein processing the metadata to detect the at least one target annotation comprises processing across the plurality of content streams.

16. The method of claim 1, further comprising: detecting the at least one target annotation in more than one of the plurality of content streams, wherein a detection indicates a presence of an artefact in at least one frame of the at least one target content stream.

17. The method of claim 1, wherein processing the metadata to detect the at least one target annotation comprises processing telemetry data.

18. The method of claim 17, wherein processing the telemetry data comprises processing at least one of the following: vector data, motion data, and location data.

19. The method of claim 1, wherein processing to detect the at least one target annotation further comprises performing the processing in accordance to at least one processing rule.

20. The method of claim 19, wherein performing the processing in accordance to the at least one processing rule comprises performing the processing based on a desired output stream associated with the at least one processing rule.

* * * * *